United States Patent
Luo et al.

(10) Patent No.: US 11,678,183 B2
(45) Date of Patent: *Jun. 13, 2023

(54) DEVICES, SYSTEMS AND METHODS FOR CONNECTING AND AUTHENTICATING LOCAL DEVICES TO COMMON GATEWAY DEVICE

(71) Applicant: Cypress Semiconductor Corporation, San Jose, CA (US)

(72) Inventors: Hui Luo, Marlboro, NJ (US); Hongwei Kong, Basking Ridge, NJ (US); Kaiping Li, Randolph, NJ (US); Sungeun Lee, Brunswick, NJ (US); Sridhar Prakasam, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,438

(22) Filed: Oct. 6, 2021

(65) Prior Publication Data

US 2022/0116771 A1    Apr. 14, 2022

Related U.S. Application Data

(63) Continuation of application No. 16/878,379, filed on May 19, 2020, now Pat. No. 11,153,754, which is a continuation of application No. 16/135,091, filed on Sep. 19, 2018, now Pat. No. 10,681,544.

(60) Provisional application No. 62/641,786, filed on Mar. 12, 2018.

(51) Int. Cl.
*H04W 4/00* (2018.01)
*H04W 12/06* (2021.01)
*H04W 12/08* (2021.01)
*H04W 8/00* (2009.01)
*H04W 48/16* (2009.01)
*H04L 9/40* (2022.01)
*H04W 4/80* (2018.01)
*H04W 88/16* (2009.01)
*H04W 84/12* (2009.01)
*H04W 88/08* (2009.01)

(52) U.S. Cl.
CPC ........ *H04W 12/06* (2013.01); *H04L 63/0428* (2013.01); *H04W 4/80* (2018.02); *H04W 8/005* (2013.01); *H04W 12/08* (2013.01); *H04W 48/16* (2013.01); *H04W 84/12* (2013.01); *H04W 88/08* (2013.01); *H04W 88/16* (2013.01)

(58) Field of Classification Search
CPC ..... H04W 12/06; H04W 12/08; H04W 48/16; H04W 4/80; H04W 8/005; H04L 63/0428
USPC ......................................................... 370/338
See application file for complete search history.

(56) References Cited

U.S. PATENT DOCUMENTS 9,606,817 B1   3/2017  Efstathopoulos
2018/0069836 A1   3/2018  Mandyam

FOREIGN PATENT DOCUMENTS

EP        2728958 A2    5/2014

*Primary Examiner* — Temica M Beamer

(57) ABSTRACT

Devices, systems and methods use a first communication interface to connect with a local device via a first protocol and use a second communication interface to connect with a server via a second protocol. Embodiments relay secure communications between the local device and the server for authentication of the at least one local device by the server and responsive to authentication of the local device by the server, transmit information for storage in a secure memory of the authenticated local device.

20 Claims, 22 Drawing Sheets

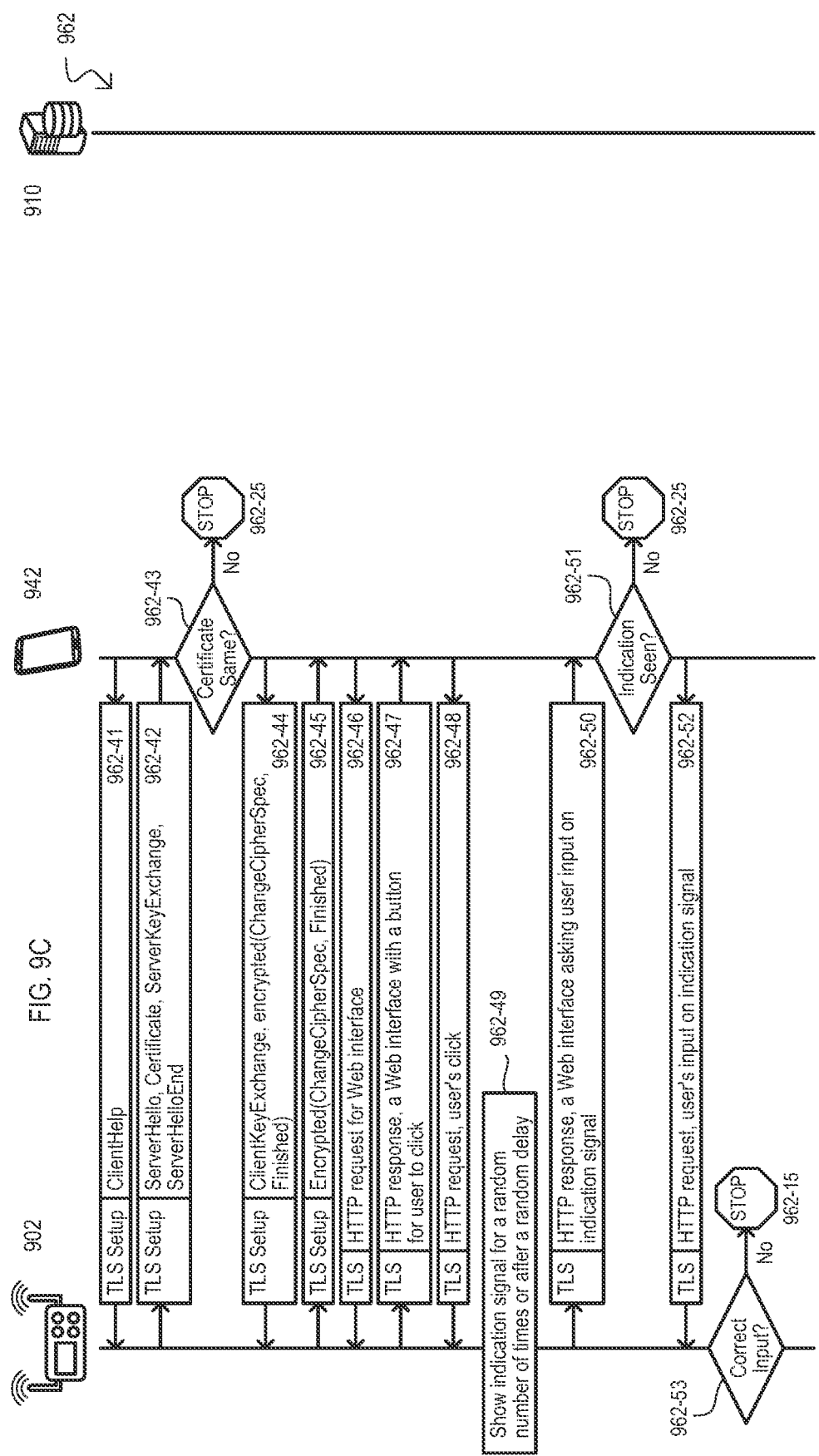

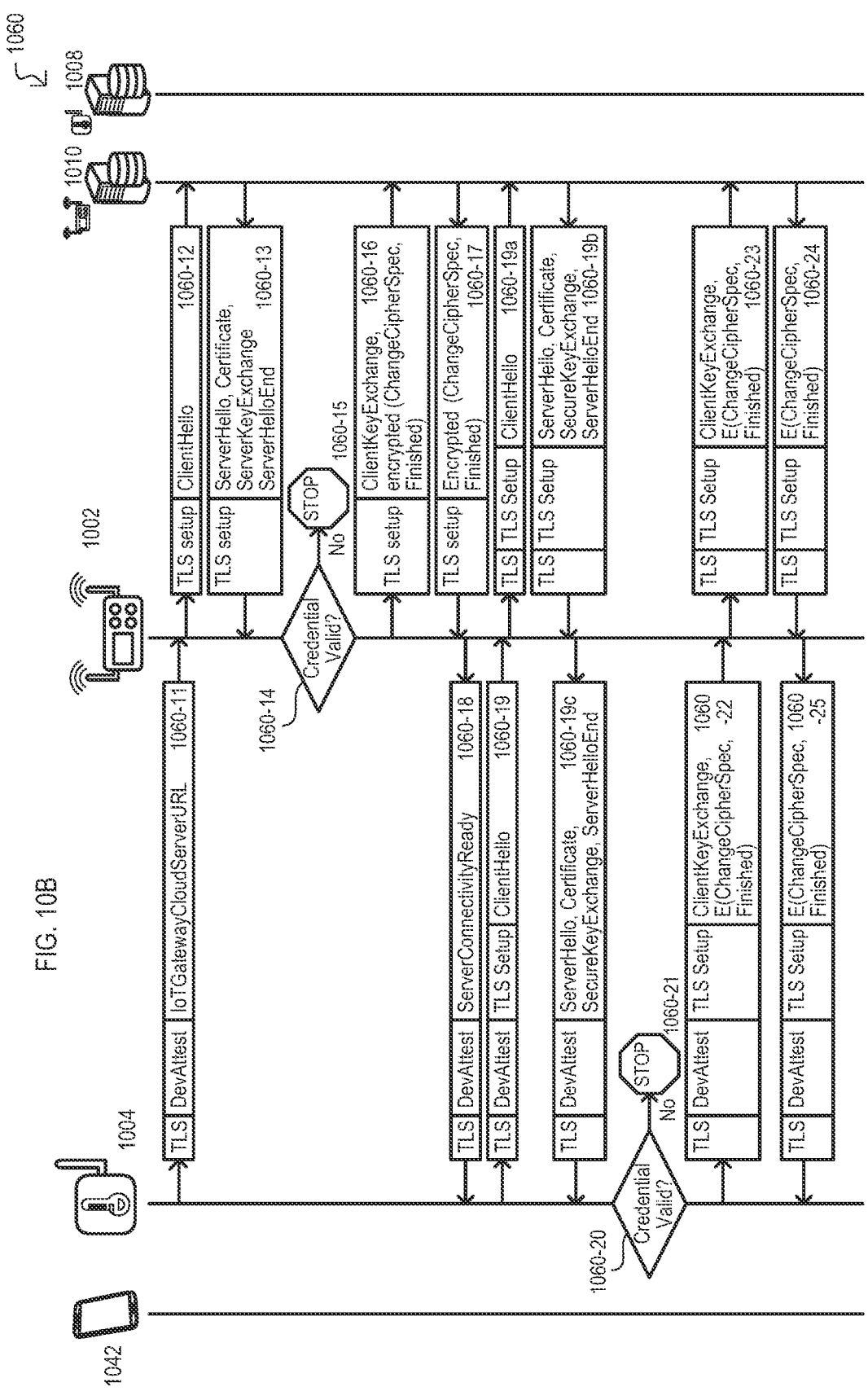

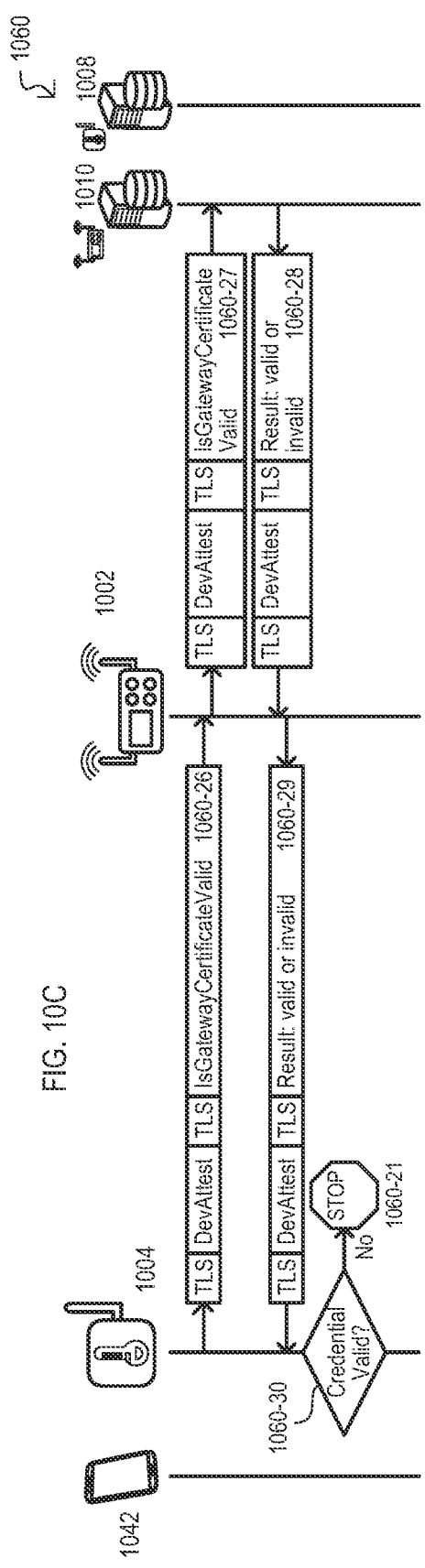

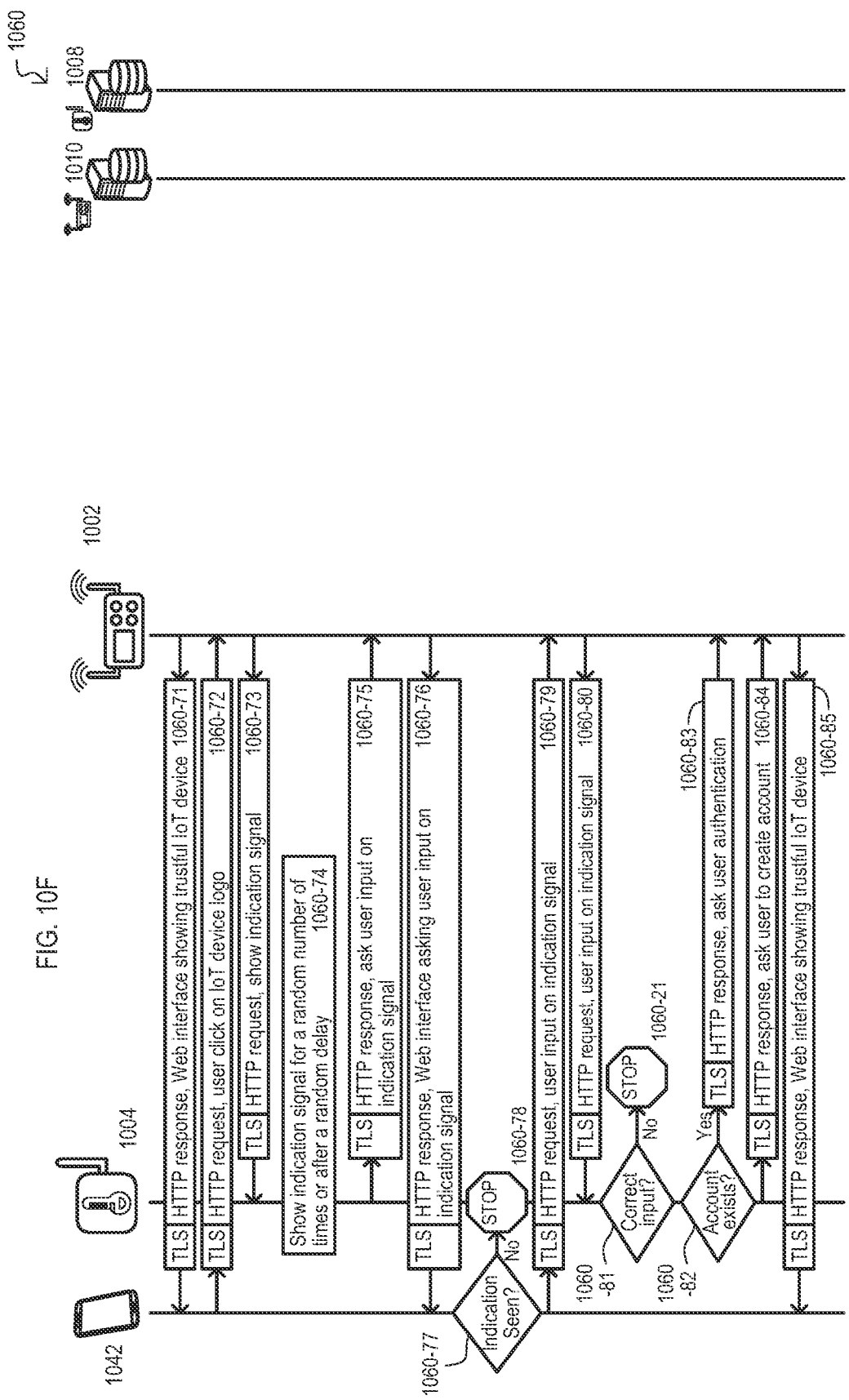

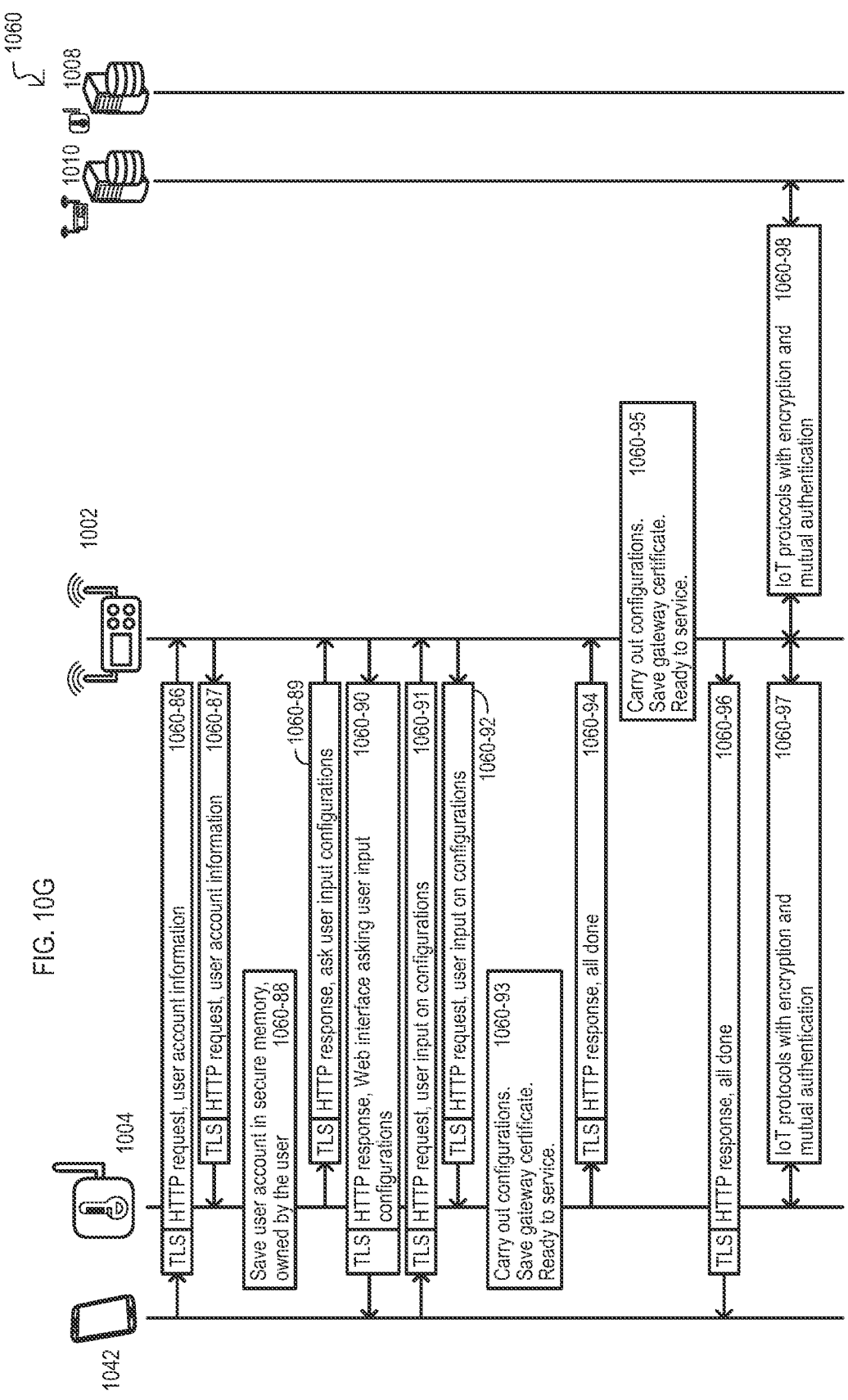

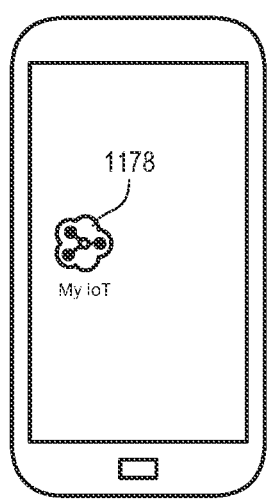
FIG. 11A
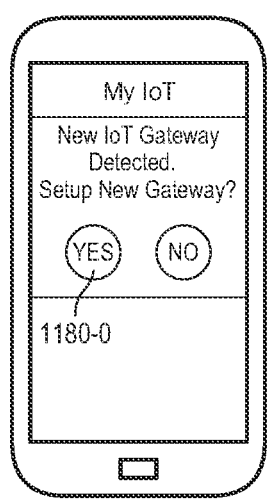
FIG. 11B
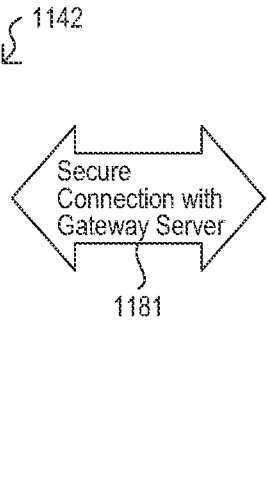
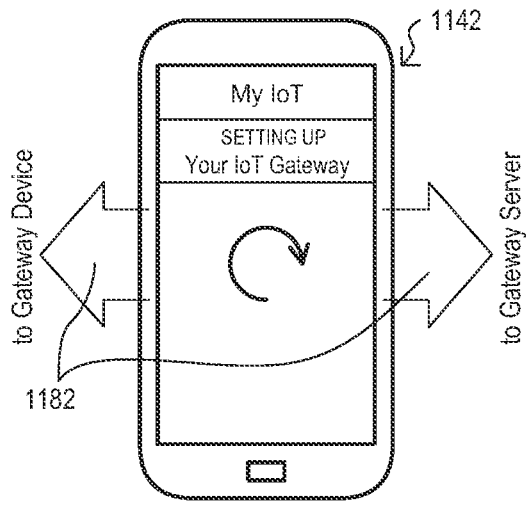
FIG. 11C
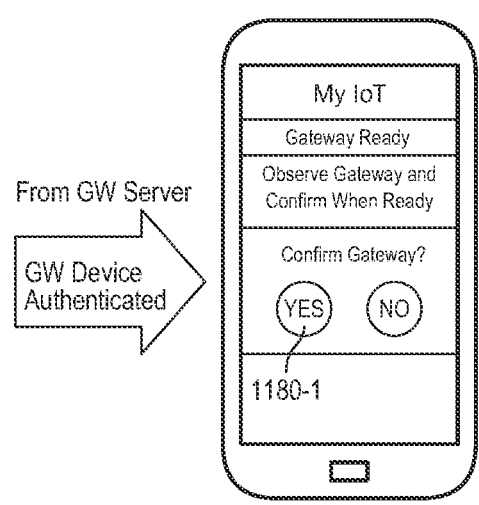
FIG. 11D
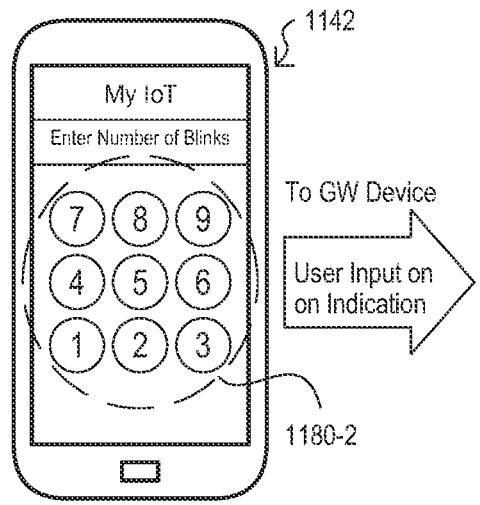
FIG. 11E
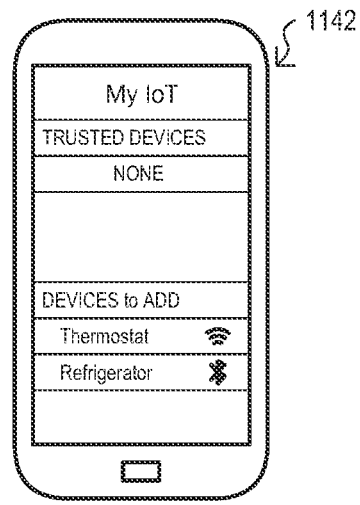
FIG. 11F

US 11,678,183 B2

DEVICES, SYSTEMS AND METHODS FOR CONNECTING AND AUTHENTICATING LOCAL DEVICES TO COMMON GATEWAY DEVICE

This application is a Continuation of U.S. patent application Ser. No. 16/878,379, filed May 19, 2020, which is a Continuation of U.S. patent application Ser. No. 16/135,091, filed Sep. 19, 2018, now U.S. Pat. No. 10,681,544, issued Jun. 9, 2020, which claims the benefit of U.S. Provisional Patent Application No. 62/641,786, filed on Mar. 12, 2018, all of which are incorporated by reference herein in their entirety.

TECHNICAL FIELD

The present disclosure relates generally to gateway devices and systems that provide access for local devices to a larger network, and more particularly to a gateway device for Internet-of-Things (IoT) and related local devices, that can authenticate and serve as network proxy for such devices.

BACKGROUND

Conventionally, a user setting up an environment with multiple Internet-of-Things (IoT) devices, typically has to create and manage multiple user accounts, as the IoT devices are rarely made the from same manufacturer or operate with a same communication protocol. That is, different IoT devices/systems made by different manufacturers in general cannot form a single IoT system. The user needs to run multiple applications (apps), and set up accounts at multiple cloud servers, one for each IoT device or each IoT system made by a manufacturer. This is burdensome for the user and creates greater chances a user's password can be comprised, as a user often resorts to using a same username or password for multiple accounts.

A conventional IoT system can typically consist of a controlling unit and several devices made by the same manufacturer (such as a security camera system). A user downloads an app from the manufacturer for configuring and controlling the IoT system. The controlling unit and the devices typically have unique IDs and MAC addresses printed on the package or on the product. A user can find them over a wireless link and identify them based on such printed IDs and MAC addresses. There is no concept of proving the trustfulness of the IoT controlling unit and devices. Thus, a malicious device with the same look and printed label can trick the user into configuring and installing it, thus creating serious security concerns.

Currently, security studies on computer networking and communications system have not found a good solution to the problem of "trust of new device", i.e., how to assure a new detected device that is to be configured and put into use is not a malicious device that looks identical to a legitimate device. A conventional approach can rely on a device having a secure boot feature to guarantee its software won't be altered, and the device possesses a secret that can authenticate itself as a proof of trust. However, there is no easy way to prove a device runs legitimate software that is guarded by secure boot feature, and a new device does not possess a secret shared with a user for authenticating purpose. A self-claimed secret or a self-claimed public key (such as those printed on the device package or user manual) do not prevent a malicious device from doing the same thing to trick the user. A security certificate issued by a well-known certificate authority (CA) or a server-verifiable public key can help create the trust, but they need careful management during device manufacturing, and thus add to the expense of the device.

This "trust of new device" problem can be even more challenging for IoT devices. First, IoT devices often lack, or have a very limited user interface, which prevent users from monitoring the software behavior of an IoT device. For example, a user can install anti-virus program on a computer to detect whether the computer runs spyware, but this cannot be done on an IoT device that runs closed, proprietary, embedded software. Second, IoT devices are typically large-volume devices, that are expected to have relatively low prices. Thus, individual security certificates built-in to each device during manufacturing can be prohibitively expensive. On the other hand, IoT devices typically do not work alone, and are typically configured into networks. Without a good solution to assure trust of new IoT device, a malicious IoT device could fool a user, get configured into a network, thus breaching the security of the entire network.

Currently, this "trust of new device" problem has not been sufficiently addressed by the IoT and related product markets.

BRIEF DESCRIPTION OF THE DRAWINGS

FIGS. 9A to 9D are a sequence of diagrams showing a method/protocol for commissioning an IoT gateway device according to a particular embodiment.

FIGS. 10A to 10G are a sequence of diagrams showing a method/protocol for commissioning an IoT device according to a particular embodiment.

FIGS. 11A to 11F are a sequence of diagrams showing a user device application for commissioning a gateway device according to an embodiment.

DETAILED DESCRIPTION

Figure 1:
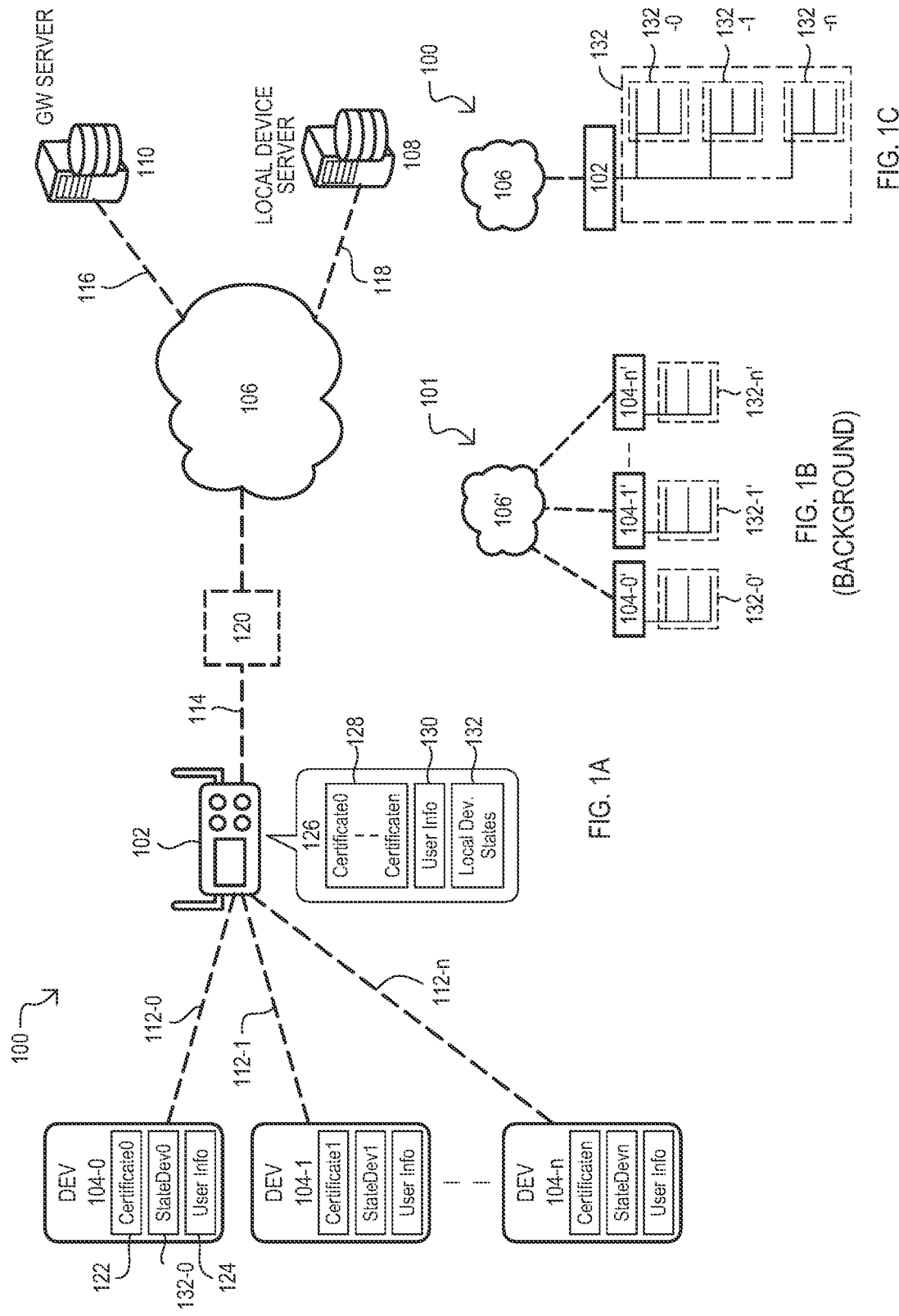
FIGS. 1A to 1C are block diagrams for illustrating a system having a gateway device for aggregating local devices according to embodiments.

According to embodiments, a gateway device can aggregate various local devices (e.g., IoT devices) as one logical device, thus a user may only need to set up one authentication credential with one device cloud server (instead of setting up authentication credentials for each local device). Once all local devices are aggregated into a gateway device, with respect to a server, the resulting system can appear as a single IoT device with many states, each state corresponding to one of the local devices. The gateway device can then serve as a network (e.g., Internet) proxy for all connected local devices.

Embodiments also disclose a method or protocol for securely commissioning a gateway device for local (e.g., IoT) devices. Such a method/protocol can include establishing a secure connection between a gateway device and a gateway server, with a user device operating as an intermediary. Using known features of the gateway device (e.g., firmware) as well as indications from the gateway device for the user to detect, the gateway device can be added to a system with the following benefits: (1) the gateway device can be proven to a user to be trustful; (2) the gateway device can prevent a user from mistakenly configuring a nearby same or similar type gateway device; and (3) the user can be prevented from unknowingly configuring an unintended device, which may be hostile (intentionally appearing as another device) or mistaken for the gateway device.

Embodiments also disclose a method or protocol for securely commissioning local devices for aggregation with a gateway device, where the local devices can be from entirely different manufacturers. Such a method/protocol can include establishing a secure connection between each local device and its corresponding local device server, with the gateway device operating as an intermediary. Using known features and indications from the local devices, the local devices can be aggregated with the gateway device with the following benefits: (1) the local device can be proven to a user to be trustful; (2) the gateway device can prove it is trustful to the local device; (3) the gateway device can be prevented from mistakenly configuring a nearby same or similar type local device; and (3) the gateway device can be prevented from unknowingly configuring an unintended device, which may be hostile (intentionally appearing as another device) or mistaken for the local device.

In the various embodiments below, like items are referred to by the same reference characters, but with the leading digit(s) corresponding to the figure number.

FIG. 1A is a block diagram of a system 100 according to an embodiment. A system 100 can include a gateway device 102 and one or more local devices 104-0 to -n. A gateway device 100 can be connected to each local device (104-0 to -n) by corresponding "internal" connections 112-0 to -n. Internal connections (112-0 to -n) can be wireless connections according to any of a number of different protocols. In some embodiments, such protocols can include, but are not limited to: cellular protocols (2G/3G, LTE, NB-IoT), Bluetooth/Bluetooth Low Energy (BT/BLE), IEEE 802.15.x, LoRa, SigFox, Weightless, Wi-Fi, WirelessHART, ZigBee, or Z-Wave. Thus, a gateway device 100 can be compatible with various different manufacturers/types of local devices (104-0 to -n). A gateway device 102 can be connected to a network 106 via an "external" connection 114. An external connection 114 can be a wired or wireless connection, and in some embodiments can include an access point 120 (AP) (e.g., router).

A gateway device 102 can include a memory system 126 that stores local device certificates 128, user information 130, and local device state data 132. Local device certificates 128 can be information to enable secure communication between local devices (104-0 to -n) and known, trustful network destinations (e.g., servers). In some embodiments, certificates 128 can include encryption data for one or more known encryption protocols. In particular embodiments, certificates 128 can include a public encryption key, a private encryption key, and a unique device ID. User information 130 can be user information for enabling control of the devices of the system 100. In some embodiments, user information 130 can include a user name and password information to enable a user to access (e.g., configure, control) gateway device 102 and local devices (104-0 to -n). Local device state data 132 can include data output from local devices (104-0 to -n) as they operate. As a result, with respect to accesses from the network 106, gateway device 102 can present a single logical point that includes state data for all local devices (104-0 to -n).

Local devices (104-0 to -n) can be devices deployed at a same general location. In some embodiments, local devices (104-0 to -n) can have relatively low power wireless transceivers. In some embodiments, local devices (104-0 to -n) can be Internet-of-Things (IoT) type devices, having relatively limited user interfaces and or computing power as compared to personal computers, mobile handsets, or server systems. Local devices (104-0 to -n) can each store their own respective certificate (one shown as 122), state data (one shown as 132-0), and user information 130. Certificates 122 can be generated by local devices (104-0 to -n) communicating with a local device server 108 through a secure connection with the gateway device 102 acting as an intermediary. This is in contrast to conventional approaches in which a local device (104-0 to -n) can communicate directly with a local device server 108 (e.g., via access point 120 or some other access point). User information 124 can be generated by communicating with gateway device 102. This is in contrast to conventional approaches in which a local device (104-0 to -n) communicates directly with a user device to establish and store user information.

Referring still to FIG. 1A, gateway device 102 can serve as proxy for local devices (104-0 to -n) to access network 106. In some embodiments, network 106 can include the Internet, however in other embodiments, network 106 can be a smaller network including a LAN or limited WAN. Thus, gateway device 102 can serve as a common access point for local devices (104-0 to -n) to access network 106. In the embodiment shown, gateway device 102 can be in communication with a gateway (GW) server 110 and one or more local device servers 108. Local devices (104-0 to -n) can also be in communication with gateway server 110 and local device server 108, but with the gateway device 102 acting as a proxy.

A gateway server 110 can be associated with gateway device 102, and capable of authenticating a gateway device for a user as well as for local devices (104-0 to -n). A gateway server 110 can have access to network 106 via communication path 116.

A local device server 108 can be associated with one or more local devices (104-0 to -n), and capable of authenticating a local device for at least a gateway device 102. A local device server 108 can have access to network 106 via communication path 106. It is understood that there can be numerous local device servers 108 for various different types or brands of local devices.

FIG. 1B is a diagram showing state data for a conventional IoT system 101. With respect to the Internet 106', IoT devices 104-0' to -n' appear as separate devices, each including their own state data 132-0' to 132-n'.

FIG. 1C is a diagram showing state data for a system 100 according to an embodiment. With respect to a network 106, gateway device 102 presents a single device with state data 132 that includes state data 132-0 to 132-n for all aggregated local devices.

Figure 2:
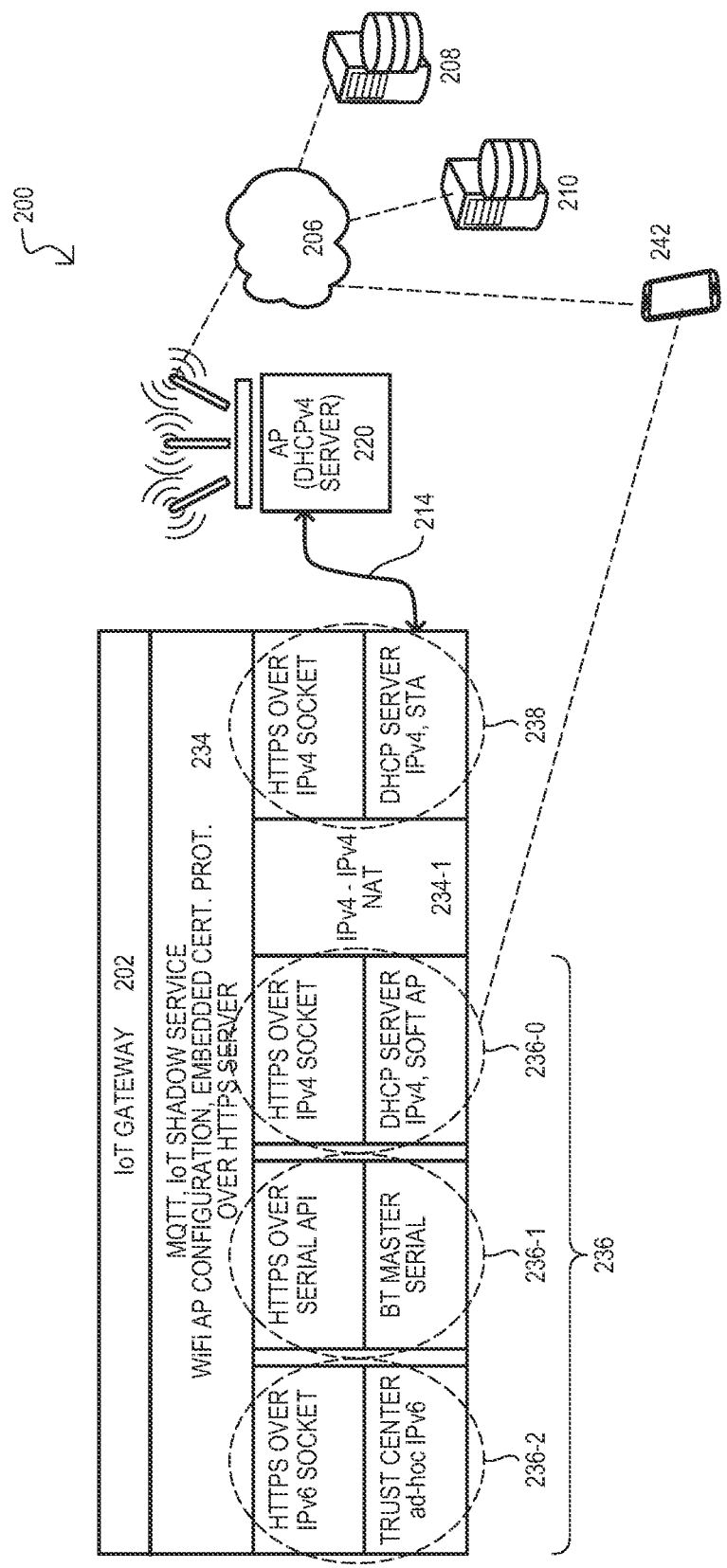
FIG. 2 is a block diagram of a system with a gateway device having IPv4 connectivity according to one particular embodiment.

Referring to FIG. 2, a system 200 according to another embodiment is shown in a block diagram. A system 200 can be one particular implementation of that shown hi FIG. 1A. System 200 can include a gateway device 202 that can connect to a network 206 via an access point (AP) 220. Network 206 can enable gateway device 202 to access one or more local device servers 206, gateway servers 208 or user devices 242. In some embodiments, network 206 can include the Internet, however in other embodiments, network 206 can be a smaller network including a LAN or limited WAN.

In the embodiment shown, gateway device 202 can provide IPv4 connectivity. In the embodiment shown, gateway device 202 can be an IoT gateway that includes a main central processing unit (CPU) 234, an internal wireless interface (IF) 236, and an external communication IF 238. A main CPU 234 can execute IoT cloud server functions (e.g., MQTT, IoT shadow service), authentication related functions (e.g. embedded certificate protocols), and any other suitable IoT device management functions. Each local (i.e., IoT) device (not shown) can have a name registered to the gateway device 202 for shadow service. In addition, main CPU 234 can provide for network address translation (NAT) 234-1 which can enable gateway device 202 to aggregate multiple local (e.g., IoT) devices and serve as a proxy for such devices. In the embodiment shown, NAT 234-1 can be IPv4 to IPv4 NAT.

Internal wireless IF 236 can enable gateway device 202 to connect to local devices and possibly user devices 242. Internal wireless IF 236 in conjunction with main CPU 234 can enable access according to at least one wireless communication protocol 236-0, which in the embodiment shown, can be according to the IEEE 802.11 specifications (e.g., Wi-Fi). Thus, gateway device 202 can serve as an access point (e.g., Wi-Fi AP) with link-layer encryption for any local devices operating according to the protocol. Further, gateway device 202 can enable peer-to-peer local connection (e.g., Wi-Fi Aware (NAN), Wi-Fi Direct (P2P)) to a user device 242 to enable the gateway device 202 to be initialized, as well as peer-to-peer local connection to local devices to enable the initialization of the local devices. In the very particular embodiment shown, main CPU 234 in combination with wireless IF 236 can form a server (e.g., DHCPv4 server) that can issue private network addresses (e.g., IPv4 addresses) to local devices and user devices 242 operating according to the protocol. In addition, main CPU 234 in combination with wireless IF 236 can run a server (e.g., HTTPS server) for IoT protocol exchanges with local devices and/or user devices or for configuration and/or for user control of the local devices.

Optionally, internal wireless IF 236 can accommodate additional protocols or standards. In the embodiment shown, main CPU 234 in combination with wireless IF 236 can provide a BT/BLE IF 236-1. In the embodiment shown, BT/BLE IF 236-1 can operate as a server (HTTPS server) for all local devices connected as BT/BLE devices. As in the case of Wi-Fi local devices, each BT/BLE local device can have a name registered to the gateway device 202 for shadow service. According to an embodiment, a BT/BLE IF 236-1 and corresponding local devices do not necessarily have to operate with a full IP stack. The BT/BLE server can be directly implemented on top of a BT/BLE serial link (e.g., HTTP messages over TLS records over serial link). This can enable local devices built with very simple BT/BLE Application Specific Integrated Circuits (ASICs) to be aggregated by gateway device 202. A BT/BLE IF 236-1 can also operate as a BLE service provider (advertiser) to signal to BLE local devices that they can be added to the system governed by the gateway device 202.

In the embodiment shown, main CPU 234 in combination with wireless IF 236 can also provide a ZigBee-type IF 236-2. A ZigBee-type IF 236-2 can operate as a trust center/coordinator/server for a ZigBee ad hoc network formed by local ZigBee devices. As in the case of Wi-Fi local devices, each ZigBee local device can have a name registered to the gateway device 202 for shadow service. In the particular embodiment shown, ZigBee-type IF 236-2 can be an IPv6 node in the ZigBee ad hoc network. ZigBee-type IF 236-2 can run a server (e.g., HTTPS server) for IoT protocol exchanges with ZigBee local devices in the ZigBee ad hoc network.

An external communication IF 238 can enable connectivity to network 206 (e.g., the Internet, LAN or limited WAN). In the embodiment shown, external communication 238 can be a wireless station, running a DHCPv4 client to get connectivity from access point 220. It can include an HTTPS client for IoT protocol exchanges with a server (e.g., 208, 210).

In system 200, while a user device 242 can communicate directly with gateway device 202 via internal wireless IF 236, a user device 242 can also communicate with gateway device 202 over network 206 (via access point 220).

Figure 3:
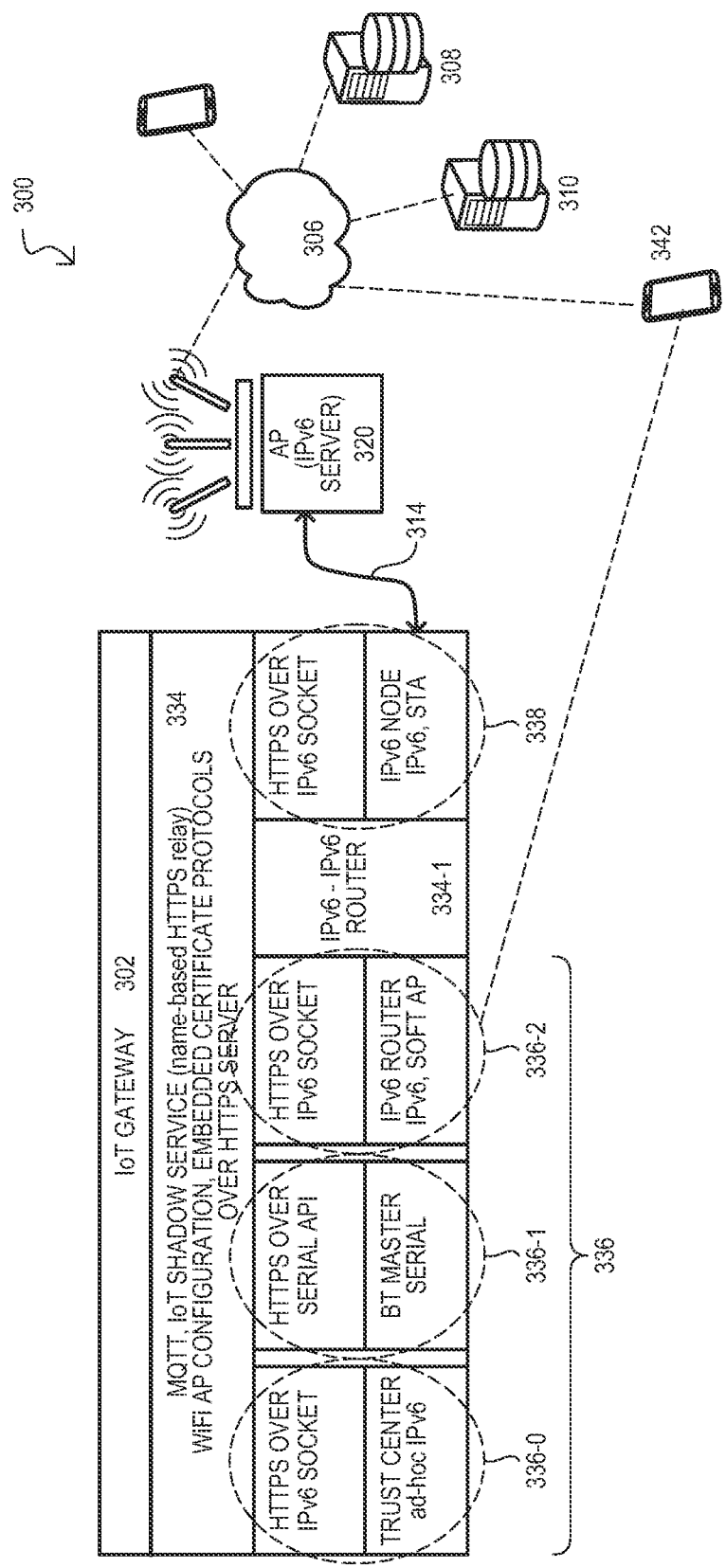
FIG. 3 is a block diagram of a system with a gateway device having IPv6 connectivity according to another particular embodiment.

Referring to FIG. 3, a system 300 according to another embodiment is shown in a block diagram. A system 300 can be one particular implementation of that shown in FIG. 1A. FIG. 3 shows items like that of FIG. 2, including a gateway device 302, a network 306, access point (AP) 320, local device servers 306, gateway servers 308, and user devices 342. In the embodiment shown, gateway device 302 provides IPv6 connectivity.

A system 300 can operate in the same general fashion as that shown in FIG. 2, but can include the following differences: An access point 320 can be an IPv6 server. Further, gateway device 302 can operate as a router 334-1 (e.g., IPv6 IPv6 router) as network translation may not be needed. In the embodiment shown, internal wireless IF 336 in conjunction with main CPU 334 can form a router (e.g., IPv6 router). Optionally, main CPU 334 in combination with wireless IF 336 can provide a BT/BLE IF 336-1 and ZigBee-type IF 336-2, as in the case of FIG. 2.

Figure 4:
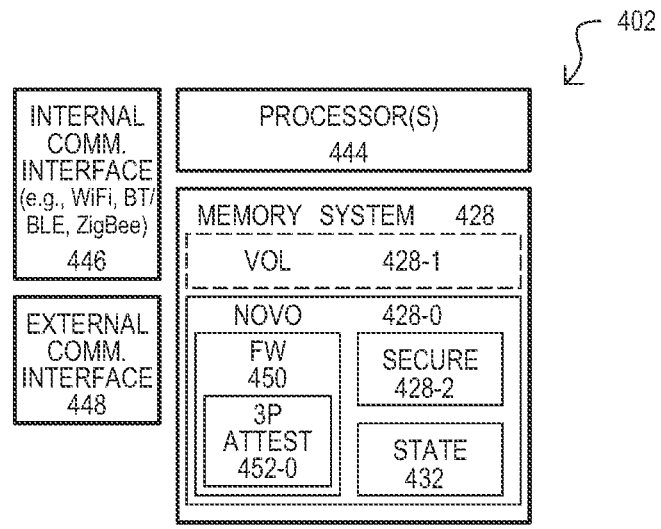
FIG. 4 is a block diagram of a gateway device according to an embodiment.

FIG. 4 is a block diagram of a gateway device 402 according to one embodiment. A gateway device 402 can be included in any of the various system embodiments disclosed herein. A gateway device 402 can include an internal communication IF 446, an external IF 448, a processor system 444, and a memory system 428. An internal communication IF 446 can be a wireless interface to communicate with local devices and can take the form of any of those described herein, or equivalents. External IF 448 can be an interface to communicate with a larger network (e.g., the Internet, a LAN or limited WAN) which can provide access to servers, including a server associated with the gateway device 402 as well as servers associated with various local devices. External IF 448 can be a wired or wireless IF and take the form of any of those described herein, or equivalents.

Processor system 444 can include one or more processors which can provide various functions of the gateway device 402. Processor system 444 can execute predetermined instructions stored in a memory system 428, where such instructions have been loaded in to volatile memory or are stored in nonvolatile memory.

Memory system 428 can include nonvolatile storage 428-0, a gateway three-party (3P) attestation protocol 452-0, a secure storage region 428-2, state data 432, and optionally, volatile storage 428-1. Nonvolatile storage 428-0 can include firmware 450, secure storage region 428-2, and state data 432. In the embodiment shown, the 3P attestation protocol 452-0 can be part of the firmware 450. Firmware 450 can include instructions for execution by processor system 444 to enable various functions of the gateway device 402. Firmware 450 can be loaded into volatile memory 428-1 from nonvolatile memory 428-0 or can be accessed directly from nonvolatile memory 428-0.

A 3P attestation protocol 452-0 can enable a gateway device 402 to create a secure connection to a gateway server using a user device, having connection to a network, as a $3^{rd}$ party intermediary. Such a secure connection can be used to authenticate the gateway device 402 with the gateway server and the user device. Various additional examples of such a 3P attestation protocol are described in more detail herein.

Secure storage region 428-2 can include storage regions that are not accessible without completing one or more predetermined security protocols and/or operations. In some embodiments, secure storage region 428-2 can store identification and encryption data for the gateway device 402. In one embodiment, secure storage region 428-2 can store a unique device identification (ID) and private encryption key for the gateway device 402. State data 432 can be provided by the gateway device 402 to indicate its operations, and in some embodiments may also include state data for local devices aggregated by the gateway device 402.

Figure 5:
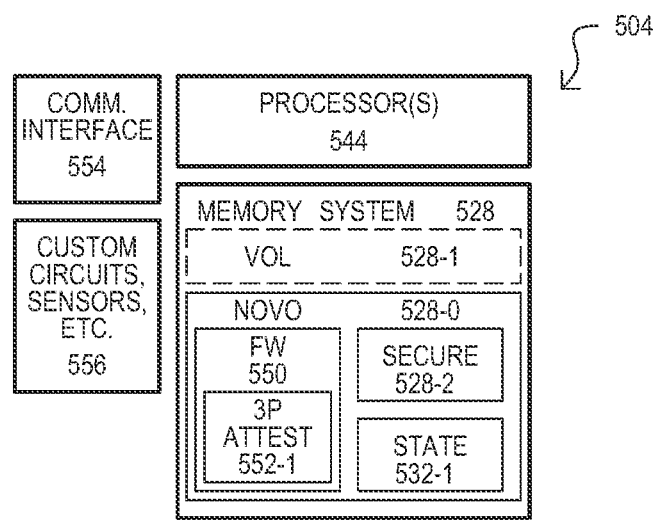
FIG. 5 is a block diagram of a local device according to an embodiment.

FIG. 5 is a block diagram of a local device 504 according to one embodiment. A local device 504 can include a communication IF 554, a processor system 544, a memory system 528, and custom circuits, sensors or other features 556. A communication IF 554 can be a wireless interface to communicate with other devices and can take the form of any of those described herein, or equivalents. Communication IF 554 can enable a local device to communicate with a gateway device, and in particular embodiments can enable peer-to-peer connections and/or discovery protocols for detecting other devices and/or advertising its presence.

Processor system 544 can include one or more processors which can provide various functions of the local device 504. Processor system 544 can execute predetermined instructions stored in a memory system 528, where such instructions have been loaded in to volatile memory or are stored in nonvolatile memory.

Memory system 528 can include nonvolatile storage 528-0, a local device three-party (3P) attestation protocol 552-1, a secure storage region 528-2, state data 532-1, and optionally, volatile storage 528-1. Nonvolatile storage 528-0 can include firmware 550, secure storage region 528-2, and state data 532-1. In the embodiment shown, firmware 550 can include local device 3P attestation protocol 552-1. Firmware 550 can also include instructions for execution by processor system 544 to enable various functions of the local device 504. Firmware 550 can be loaded into volatile memory 528-1 from nonvolatile memory 528-0 or can be accessed directly from nonvolatile memory 528-0.

A local device 3P attestation protocol 552-1 can enable a local device 504 to create a secure connection to a local device server using a gateway device as a $3^{rd}$ party. Such a secure connection can be used to authenticate the gateway device for the local device, and to authenticate the local device 504 for the gateway server. Various additional examples of such a local device 3P attestation protocol are described in more detail herein.

Secure storage region 528-2 can include storage regions like those described for FIG. 4. In some embodiments, secure storage region 528-2 can store identification and encryption data for the local device 504. In one embodiment, secure storage region 528-2 can store a unique device ID and private encryption key for the local device 504. State data 532-1 can be generated by the local device 504 to indicate its intended functions. State data 532-1 can be provided to a gateway device (e.g., HTTP POST) or can be requested by a gateway device (e.g., HTTP GET).

While various methods are understood from the description of systems and devices shown herein, particular methods will now be described with reference to a number of flow diagrams.

Figure 6:
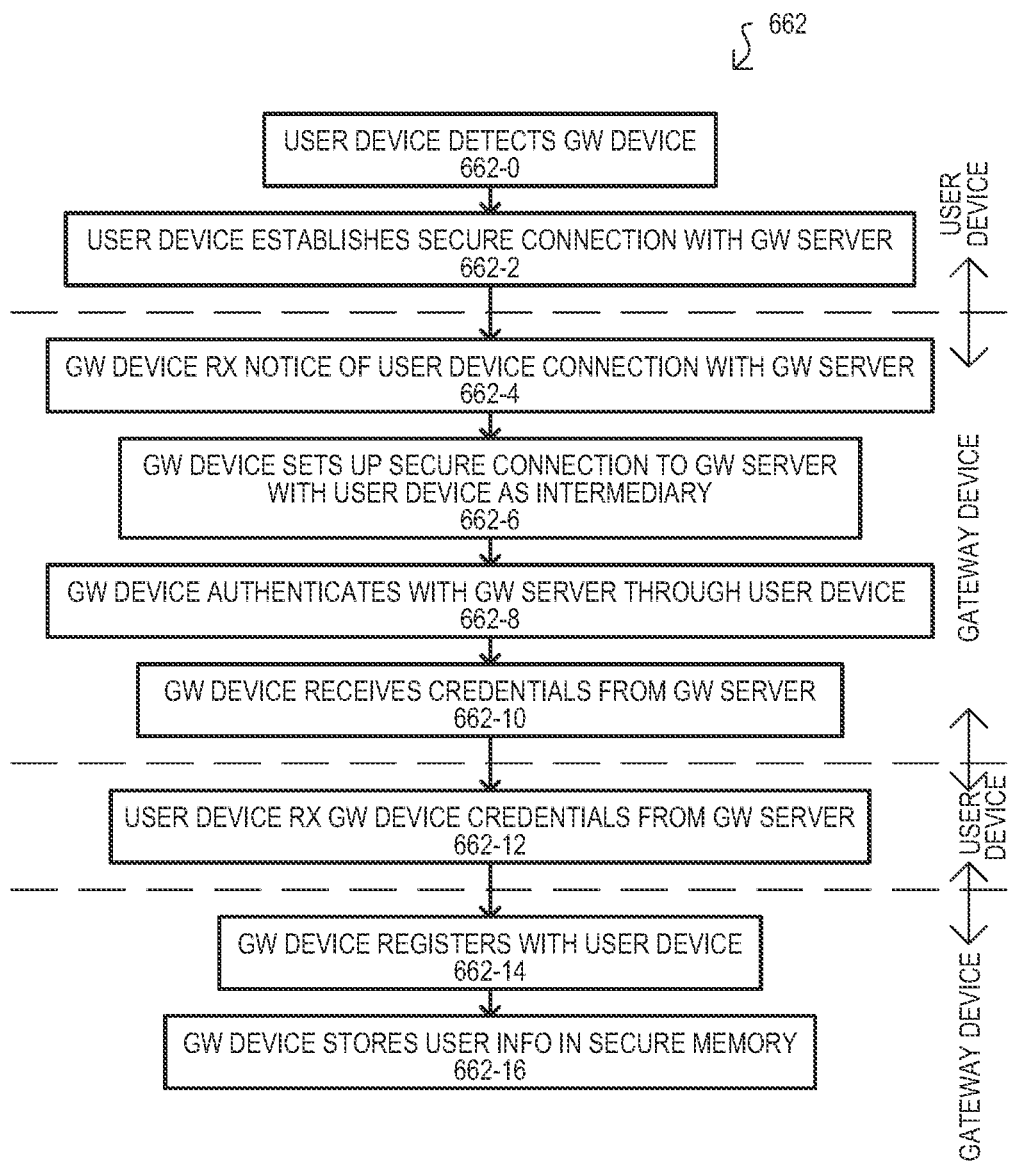
FIG. 6 is a flow diagram of a method for commissioning a gateway device according to an embodiment.

FIG. 6 shows a method 662 according to an embodiment. Method 662 can show the commissioning of a gateway device, where a gateway device is initialized and authenticated, enabling it to be added as a trusted device in a system. A method 662 can include a user device detecting a gateway device (action 662-0). Such an action can include a gateway device being activated, and then sensed by a user device according to any suitable detecting protocol. In some embodiments, such an action can include a user physically activating the gateway device (e.g., pushing a button) to enable it to transmit its presence and/or enter an initialization protocol. However, a user device detecting a gateway device can include any other suitable method, including entering a predetermined network address into an application running on the user device.

A user device can include any suitable computing device used to setup a system (e.g., deployed IoT network), including but not limited to: a personal computer (e.g., desktop, laptop, two-in-one, tablet) or handheld computing device (e.g., smart phone, PDA), as but a few of many possible examples.

A user device can establish a secure connection with a gateway server (action 662-2). Such an action can include a user device starting a program that can locate and connect with a gateway server. In some embodiments, such an action can include a user device receiving a network address (e.g., private IP address or URL) for the gateway server and operating a web browser to contact the gateway server.

A gateway device can receive notice that the user device has a secure connection with a gateway server (action 662-4). Such an action can include the gateway device receiving a message over an internal communication interface from the user device.

In response to receiving notice of a connection to a gateway server, a gateway device can execute a gateway 3P attestation protocol. This can include setting up a secure connection to the gateway server with the user device acting as an intermediary (action 662-6). Such an action can provide end-to-end security between the gateway device and the gateway server.

In particular embodiments, action 662-4 can include a user device establishing a connection to the gateway server at a particular endpoint (e.g., socket). Once the gateway 3P attestation protocol starts, action 662-6 can create a connection to a different endpoint (e.g., an endpoint indicated for or dedicated to, authentication of gateway and possibly other devices).

Once end-to-end security has been established with a gateway server, a gateway device can authenticate itself with the gateway server (with the user device still operating as an intermediary) (action 662-8). Such an action can include any suitable authentication methods, and particular authentication methods are described in more detail herein. If authentication is complete, a gateway device can receive a credential from a gateway server (action 662-10). It is understood that "credentials" as used herein is intended to describe information that authenticates the gateway server, and may include a device ID, cryptographic keys, or a full digital certificate.

In the embodiment of FIG. 6, a user device may also receive a credential for the gateway device from the gateway server (action 662-12). In this way, the gateway device is authenticated to the user device, so the user knows the gateway device is a trusted device and can be added to a system.

Once the gateway device is authenticated, it can register with the user device (action 662-14). Such an action can include generating user information for accessing, configuring, and controlling the gateway device, as well as any local devices connected to the gateway device. In some embodiments, this can include a user name, password, and any other suitable security methods or protocols. Such user information can then be stored in a secure memory of the gateway device (action 662-16).

Figure 7:
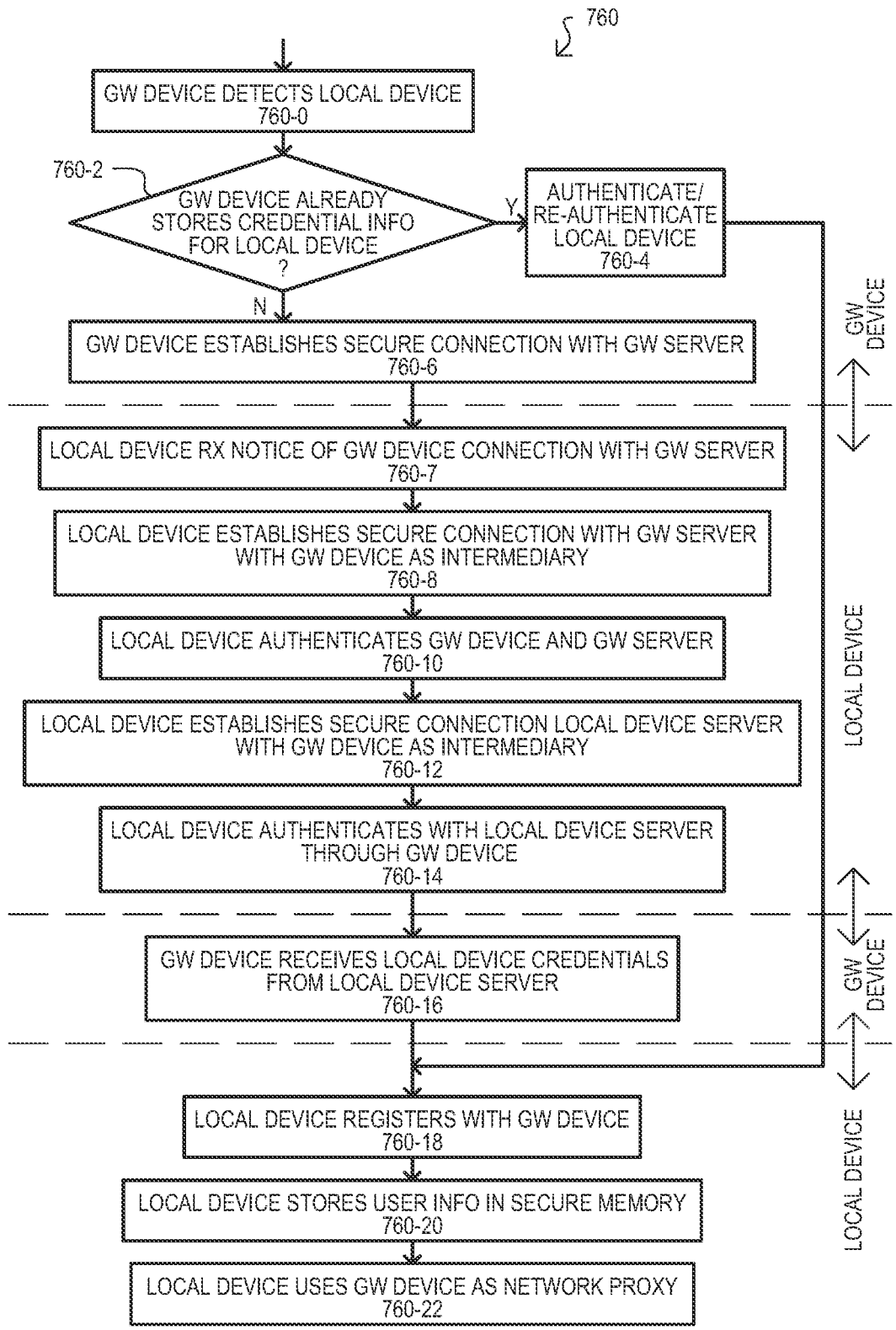
FIG. 7 is a flow diagram of a method for commissioning a local device into a system having a gateway device according to an embodiment.

FIG. 7 shows a method 760 according to another embodiment. Method 760 can show the commissioning of a local device with a gateway device, enabling the local device to be added to a system, and aggregated with other local devices with the gateway device. A method 760 can include a gateway device detecting a local device (action 760-0). Such an action can include a gateway device sensing a local device according to any suitable detecting protocol. In some embodiments, such an action can include a user physically activating the local device (e.g., pushing a button) to enable it to transmit its presence and/or enter an initialization protocol. Such an action could also include a user device initiating a detection procedure in the gateway device.

A gateway device can then determine if it already includes a credential for the local device (action 760-2). Such an action can include a gateway device comparing received data from a local device with security data already stored. For example, a gateway device may have already authenticated another local device of the same type or same manufacturer or may be re-connecting a previously authenticated device to the system. If the gateway device already stores credential information for the local device (Y from 760-2), the local device can be authenticated (or re-authenticated) with such credential information (action 760-4). If a gateway device does not already store credential information for the local device, a gateway device can establish a secure connection with a gateway server (action 760-6).

A local device can receive notice that the gateway device has a secure connection with a gateway server (action 760-7). Such an action can include the local device receiving a message from an internal communication interface of the gateway device. In response to receiving notice of a connection to a gateway server, a local device can execute a local device 3P attestation protocol. This can include setting up a secure connection to the gateway server with the gateway device acting as an intermediary (action 760-8). Such an action can provide end-to-end security between the local device and the gateway server.

In particular embodiments, action 760-6 can include a gateway device establishing a connection to the gateway server at a particular endpoint (e.g., socket). Once the local device 3P attestation protocol starts, action 760-8 can create a connection to a different endpoint (e.g., an endpoint indicated for, or dedicated to, authentication of gateway devices).

Once end-to-end security has been established with a gateway server, a local device can authenticate the gateway device and gateway server (action 760-10). Such an action can include any suitable authentication methods, and particular authentication methods are described in more detail herein.

Once authentication of the gateway device has been established, local device can execute another local device 3P attestation protocol. This can include setting up a secure connection to a local device server with the gateway device acting as an intermediary (action 760-12). Such an action can provide end-to-end security between the local device and the local device server.

Once end-to-end security has been established with a local device server, a local device can authenticate with the local device server (action 760-14). Such an action can include any suitable authentication methods, and particular authentication methods are described in more detail herein. Once the local device is authenticated, a gateway device can receive a credential for the local device from a local device server (action 760-16).

A local device can register with the gateway device (action 760-18). Such an action can include receiving user information for accessing, configuring, and controlling the local device. Such user information can then be stored in a secure memory of the gateway device (action 760-20). A local device can then operate using the GW device as a network (e.g., Internet) proxy (action 760-22).

Figure 8:
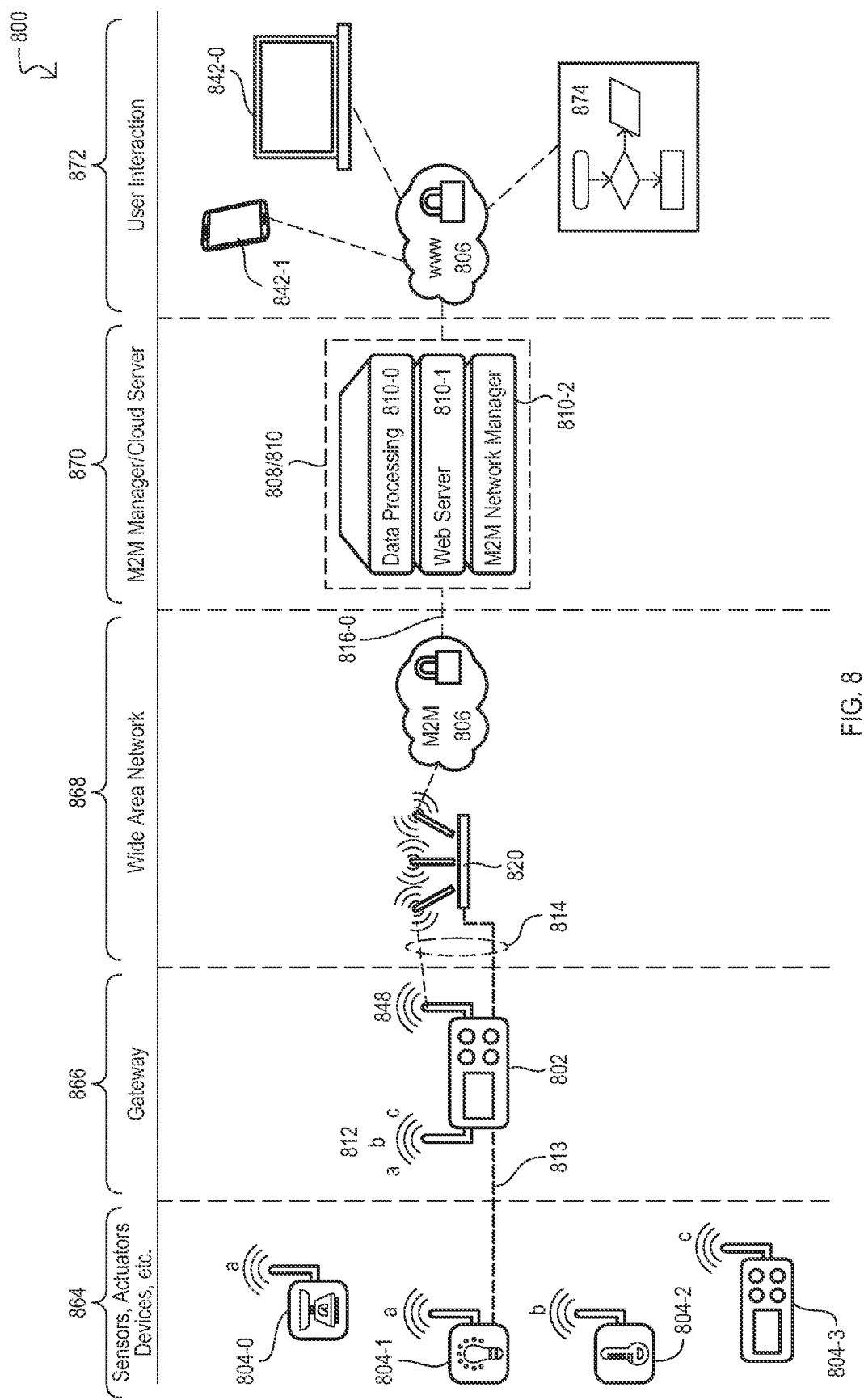
FIG. 8 is a block diagram of an IoT system having a gateway device for aggregating IoT devices according to an embodiment.

Referring now to FIG. 8, another system 800 according to an embodiment is shown in a block diagram. System 800 can be an IoT system for aggregating multiple IoT devices behind a gateway device, which can serve as an Internet proxy for the IoT devices and present a single logical entity for servers receiving or requesting data from IoT devices. System 800 can be one particular implementation of any of those shown in FIG. 1A, 2 or 3.

A system 800 can be conceptualized as including an IoT device section 864, a gateway section 866, a wide area network (WAN) section 868, a cloud server section 870, and a user interaction section 872. An IoT section 864 can include a number of IoT devices for aggregation by an IoT gateway device. FIG. 8 shows four different IoT devices 804-0 to -3. IoT devices (804-0 to -3) can communicate according to various different wireless protocols, such as Wi-Fi, BT/BLE, ZigBee, as but a few of many possible examples. Such different protocols are indicated by a letter next to an antenna representation of each IoT device symbol. Thus, IoT devices 804-0/1 can communicate according to wireless protocol "a", IoT device 804-2 communicates according to wireless protocol "b", and IoT device 804-3 communicates according to wireless protocol "c". However, embodiments are not limited to IoT devices making wireless connections. For example, IoT device 804-1 could be capable of having a physical connection (wired or other) 813 to another device.

A gateway section 866 can include a gateway device 802, according to any of the embodiments herein, or equivalents. Gateway device 802 can have a wireless connection to IoT devices according to multiple wireless protocols, over an internal communication IF 812. In the embodiment shown, internal communication IF 812 can communicate according to protocols "a", "b" and "c", and thus be capable of aggregating and serving as a network proxy for IoT devices (804-0 to -3) operating with different communication protocols. In the embodiment shown, gateway device 802 can have a connection 814 to WAN section 868. Such a connection 812 can be a wireless connection, via an external communication interface 848, or a wired connection.

A WAN section 868 can include an access point 820 for connecting to network 806. Access point 820 can have a wired or wireless connection to gateway device 802, and a wired or wireless connection to network 806. Network 806, which can include the Internet, can enable secure machine-to-machine (M2M) communication between gateway device 802 and servers, or between IoT devices (804-0 to -3) and servers with gateway device 802 acting as an intermediary.

A cloud server section 870 can include one or more servers, including gateway servers 810 and IoT device servers 808. Such servers 808/810 can include any of a data processing section 810-0, a web sewer section 810-1, and a M2M network manager 810-2. A data processing section 810-0 can execute data processing on data received from IoT devices or gateway devices. Web server 810-1 can process requests received over network 806, including requests from IoT devices (804-0 to -3), gateway device 802, or user devices (842-0/1). An M2M network manager 810-2 can provide any suitable service for managing IoT devices and connections to IoT devices, including but not limited to: monitoring a state of IoT devices, a quality of connection to IoT devices, configure IoT devices, updating (e.g., firmware) of IoT devices, or storing configuration data for IoT devices. It is understood that once IoT devices (804-0 to -3) are aggregated by gateway device 802, they will appear to servers 808/810 as one large device having state data like that shown in FIG. 1C. As but one example, state data for each IoT device (804-0 to -3) can appear as a top-level sub-tree, which may have one or more named state variables, or lower hierarchy sub-trees. A servers 808/810 can handle all such state values without knowing they correspond to separate IoT devices behind a gateway device 802.

A user interaction section 872 can include network 806, one or more user devices 842-0/1, and automated processes 874. Network 806, which can include the Internet, can enable secure connections to servers 808/810 and/or gateway device 802 according to various predetermined protocols (e.g., HTTPS). As noted herein, a user device can be any suitable device, and in FIG. 8 can include a laptop computer 842-0 and a smartphone 842-1. User devices 842-0/1 may also be capable of direct communication with gateway device 802, via an internal communication IF 812, when in close enough proximity to gateway device 802. User devices 802-0/1 can include an application for enabling authentication of gateway device, including serving as an intermediary in a gateway device authentication process. Such an application can also enable gateway device 802 and IoT devices (804-0 to -3) to be configured. Automated processes 874 can be processes executed based on operations of IoT devices (804-0 to -3). For example, automated processes can respond to data received from IoT devices (804-0 to -3) (via gateway device 802) and/or activate IoT devices (804-0 to -3) to execute particular operations (again, via gateway device 802).

Referring now to FIGS. 9A to 9D, a method 962 of commissioning a gateway device according to an embodiment is shown in a series of diagrams. FIGS. 9A to 9D show communications that can occur between a gateway device 902, a user device 942, and a gateway server 910.

Figure 9A:
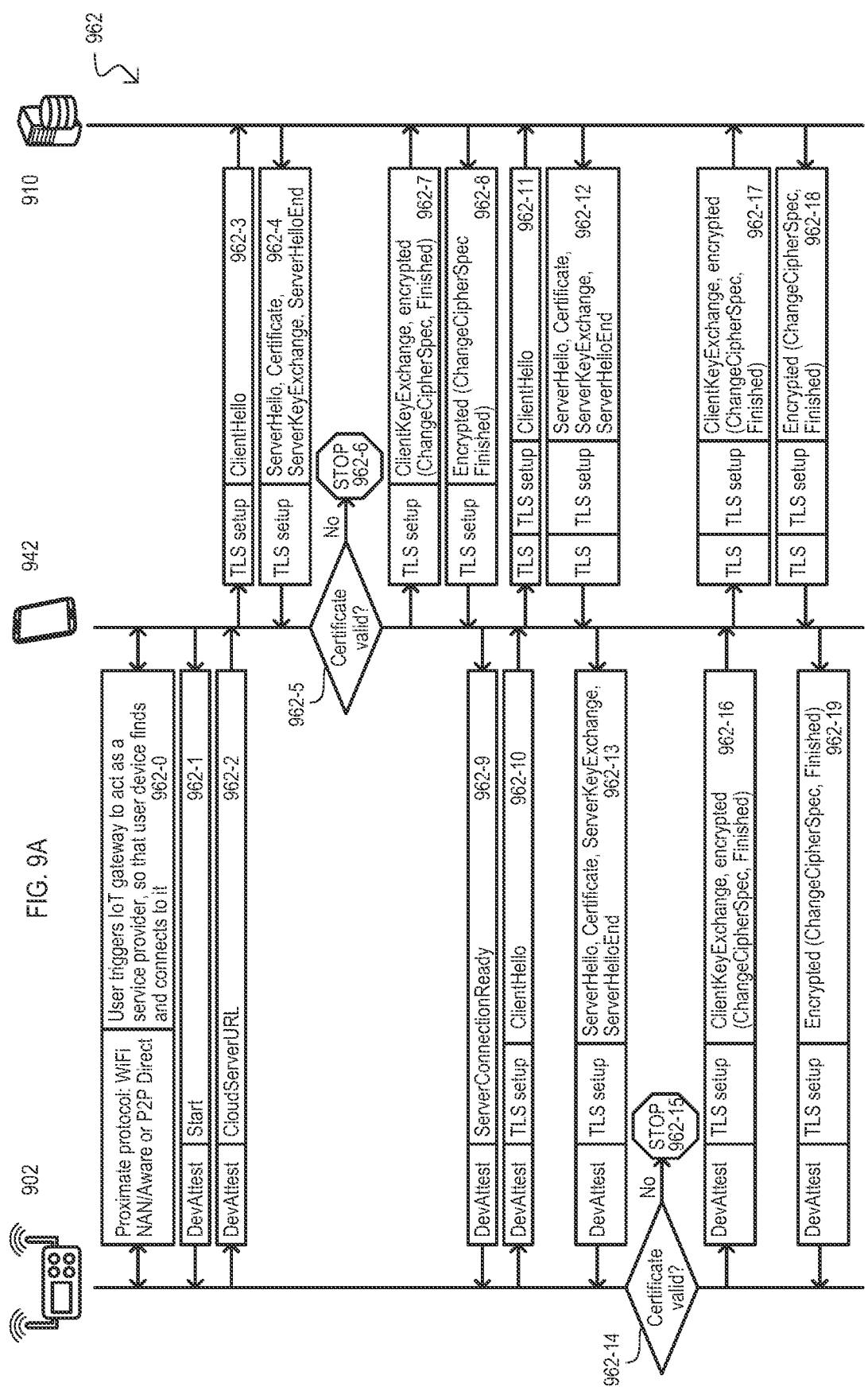

Referring to FIG. 9A, initially a gateway device 902 is not commissioned. An application can be installed on user device 942 to enable a gateway 3P attestation protocol, as will be described below. It is assumed that a user has created a user account on gateway server 910 with the application. Such a user account can enable a user to subscribe to a status update for gateway device 902 once it is commissioned.

By operation of the gateway device, user device, or both, a user device 942 can detect a gateway device. A connection can then be made between the user device and gateway device. In the embodiment shown, a user can trigger the gateway device 902 (e.g., by pressing a physical button or resetting the gateway device) which can start a wireless proximity protocol (e.g., Wi-Fi Direct/P2P or Wi-Fi Aware-NAN). Gateway device 902 can thus act as a proximate service provider with low signal strength on an internal communication IF (e.g., providing "IoT gateway user initialization" service). This can enable a user device to find and connect to the gateway device via the internal communication IF of the gateway device 962-0. Such a connection can be over an open or PSK-based encrypted Wi-Fi link. An application on user device 942 can start a gateway device attestation process 962-1.

User device 942 can run DHCP to get a private IP address from the gateway device's internal Wi-Fi interface. This can include gateway device 902 providing a URL for the gateway server to user device 962-2.

User device 942 can open a connection to gateway server 910, which in the embodiment shown can be an insecure socket connection to the port corresponding to the "gateway device user initialization" service 962-3. No mutually authenticated TLS socket connection can be established at this stage because the gateway device is not configured yet. A user device can confirm a certificate of gateway server 962-5. If a certificate is not valid (No from 962-5), a process can end 962-6 If a certificate is valid, a secure connection can be established between a user device and gateway server 962-7/8. After the socket connection between the user device and gateway server is established, a user device can indicate to the gateway device that such a connection is ready 962-9.

Upon receiving notification of the secure connection, gateway device can start a gateway device 3P attestation protocol by sending a gateway server URL and a TLS connection request to the user device, expecting the user device to relay its TLS messages to the gateway server with the user device's Internet connectivity 962-10 to -13. A gateway device 962-14 can validate a certificate of the gateway server and user device 962-14 and stop the process (962-15) if the certificates cannot be determined to be valid. It is noted that the connection at this point can be a TLS connection that provides end-to-end security between the gateway device and the gateway server.

A user device can then enable another TLS socket connection to the gateway server (this TLS connection provides end-to-end security between the user device and the gateway server) and starts relaying TLS messages between the gateway server and the gateway device 962-16 to -19.

Figure 9B:
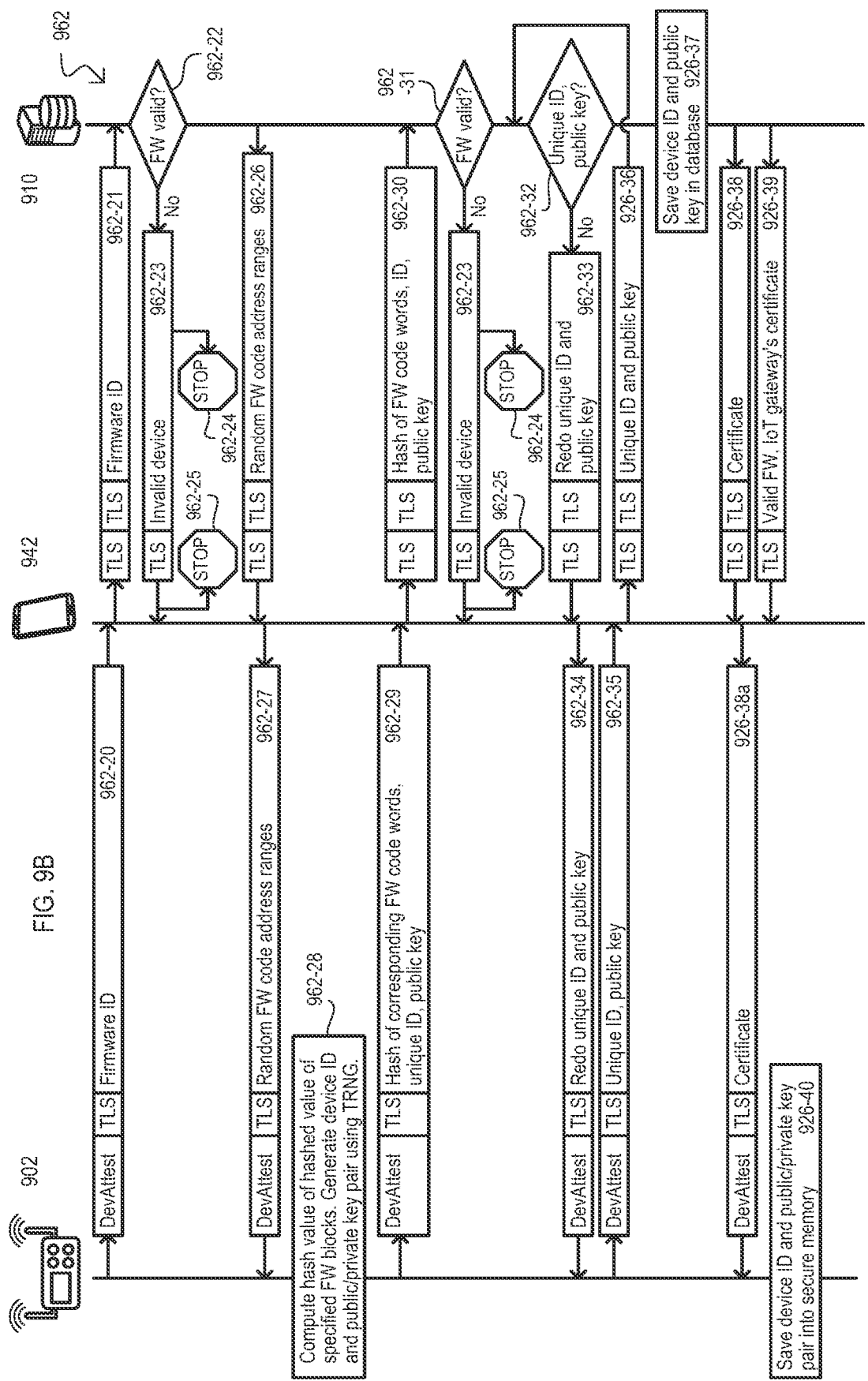

Referring now to FIG. 9B, a method 962 can further include a gateway server validating the firmware of the gateway device. Such actions can include a gateway device sending a firmware ID to gateway server 962-20/21, which can confirm if the firmware ID is valid 962-22. If the firmware is determined to not be valid (No from 962-22), the gateway device can be determined to be invalid 962-23, and the process can stop in the gateway server 962-24 and in the user device 962-25.

If the firmware ID is determined to be valid, a gateway server 962-26 can indicate particular portions (e.g., address ranges) of the firmware for the gateway device 962-26/27. A gateway device can execute predetermined operations on the firmware values at the indicated locations. The gateway device can also generate a device ID and encryption data. In particular embodiments, gateway device can execute a pre-determined hash function on the firmware values and use a random number generator to generate a device ID and public/private encryption keys 962-28. The hashed firmware values, device ID and public encryption key can then be forwarded to the gateway server with the user device acting as an intermediary 962-29/30.

Based on the received hashed firmware values, gateway server can determine if the firmware is valid 962-31. If the firmware is determined to not be valid (No from 962-31), the gateway device can be determined to be invalid 962-23, and the process can stop in the gateway server 962-24 and in the user device 962-25.

If the firmware is determined to be valid, the gateway device can determine if the received device ID and public encryption key are sufficiently unique 962-32. If the user ID or public encryption key are not sufficiently unique (No from 962-32), the gateway server can request the gateway device to generate new values 962-33/34. The gateway device can then generate a new device ID and public/private encryption keys and send the new device ID and public encryption key to the gateway server 926-35/36. This process can repeat until the device ID and public encryption key is determined to be sufficiently unique.

Once the device ID and public encryption key are determined to be sufficiently unique, the gateway device can store the values in a database 926-37. The gateway server forwards an authenticated certificate to the gateway device 926-38/38a. Gateway device can store its generated device ID and public/private encryption key pair into a secure memory 926-40. The gateway device 3P attestation protocol can then end.

Gateway server can indicate to the user device that the gateway device firmware is valid and send the gateways authentication certificate. The user device now knows the gateway device is a trusted device can be added to a system.

Referring now to FIG. 9O, a user device can open a secure connection (e.g., TLS connection) to the gateway device based on the gateway device's certificate. In the embodiment shown, this can include connecting to a particular HTTPS port of the gateway device 926-41 to -45. In such a process, a user device can determine if the gateway device's certificate is still valid 962-43. If the certificate is determined to not be valid (No from 962-43), the process can stop in the user device 962-25.

A method 962 can then include additional actions to ensure the gateway device can be trusted, by having a user of the user device personally observe an indication generated by the gateway device. In PG. 9C, such actions can include a user selecting the gateway device by operating a button on a Web interface or application of the user device 962-45 to -47.

Upon the user selecting the gateway device on the user device 962-48, the gateway device can generate a predetermined indication. In the embodiment shown, such an action can include the gateway device generating an indication signal for a random number of times, or after a random delay 962-49. Such an indication signal can take the form of a visual indication (e.g., light), auditory indication, a tactile indication (e.g., vibration), or any other suitable indication perceivable by a user. A gateway device can then request a user input to verify the indication was observed by the user 962-50.

If the user does not detect an indication from the gateway device (No from 962-51), the process can stop in the user device 962-25. If the user does detect the indication, the user can provide an input at the user device that can verify the indication. Such an input can be sent to the gateway device 962-52.

If the user input is not correct (No from 962-53), the process can stop 962-15. To rule out coincidence, the above two steps can be repeated several times.

Figure 9D:
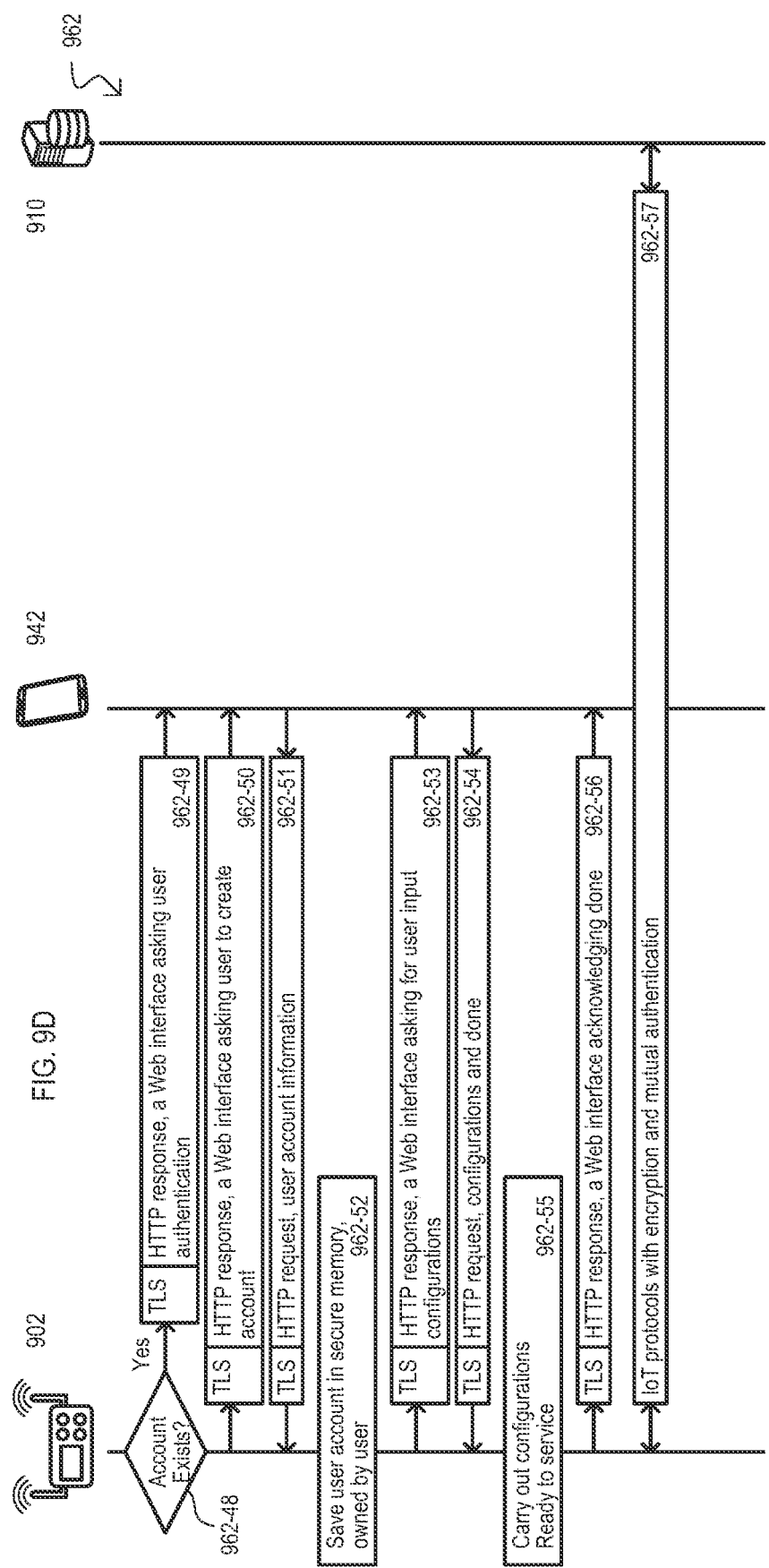

Referring now to FIG. 9D, after the user provides a correct answer to the gateway device confirming the proper indication was detected, the gateway device can determine if it was previously registered (e.g., owned) by a user 962-48. If the gateway device was previously registered (Yes from 962-48), it can request user authentication. In the embodiment shown, such a request can be via a Web interface presented to user device 962-49. If the user cannot provide proper user information, the gateway device cannot be configured, and will remain inaccessible until proper authentication is provided.

If the gateway device was not previously registered to a user, the gateway device can allow a user to create an account by requesting and receiving account information 962-50/51. Received account information can then be stored in secure memory of the gateway device 962-52. After the user account information is securely saved in the gateway device, the gateway device will not allow another user to configure it until the user account is deleted by the legitimate user (i.e., the gateway device can only be decommissioned by the original user who commissioned it).

After gateway device is registered to the user, by saving the user account information in the gateway device, the user can proceed to configure the gateway device. In the embodiment shown, such actions can occur via a web interface 962-53/54. Gateway device can carry out any configurations and then be ready for service 962-55. Gateway device can also signal to the user device that it is ready 962-56.

The gateway device can then start running IoT protocols with the gateway server, including updating its states to the gateway server and retrieving pending state change commands from the gateway server. At this point, the gateway device can also be prevented from executing wireless proximity protocols to provide the "gateway device user initialization" service until it is decommissioned.

After the gateway device is put in use, the user can connect to the gateway device (e.g., via its HTTPS port) at any time to change configuration or decommission the gateway device. Since the gateway device has had a user account stored in its non-volatile memory, it will ask the user to authenticate itself before allowing such operations to proceed.

It is noted that the above method 962 does not require anything more from a user than simple steps similar to those performed when configuring an ordinary IoT device: triggering the gateway device to start a configuration protocol, creating a user account at a gateway server, and configuring the IoT device using a Web interface. However, the method 962 can offer the following advantages: (1) it can prove to a user that a to-be-configured gateway device can be trusted; (2) it can prevent a user from mistakenly configuring a nearby same-type gateway device; and (3) it can prevent a nearby user from mistakenly or hostilely configuring a gateway device that is being configured by a legitimate user.

Referring now to FIGS. 10A to 10G, a method 1060 according to another embodiment is shown in a series of diagrams. FIGS. 10A to 10G show communications that can occur between a user device 1042, an IoT device 1004, a commissioned gateway device 1002, a gateway server 1010, and a cloud server 1008 for the IoT device 1004.

Figure 10A:
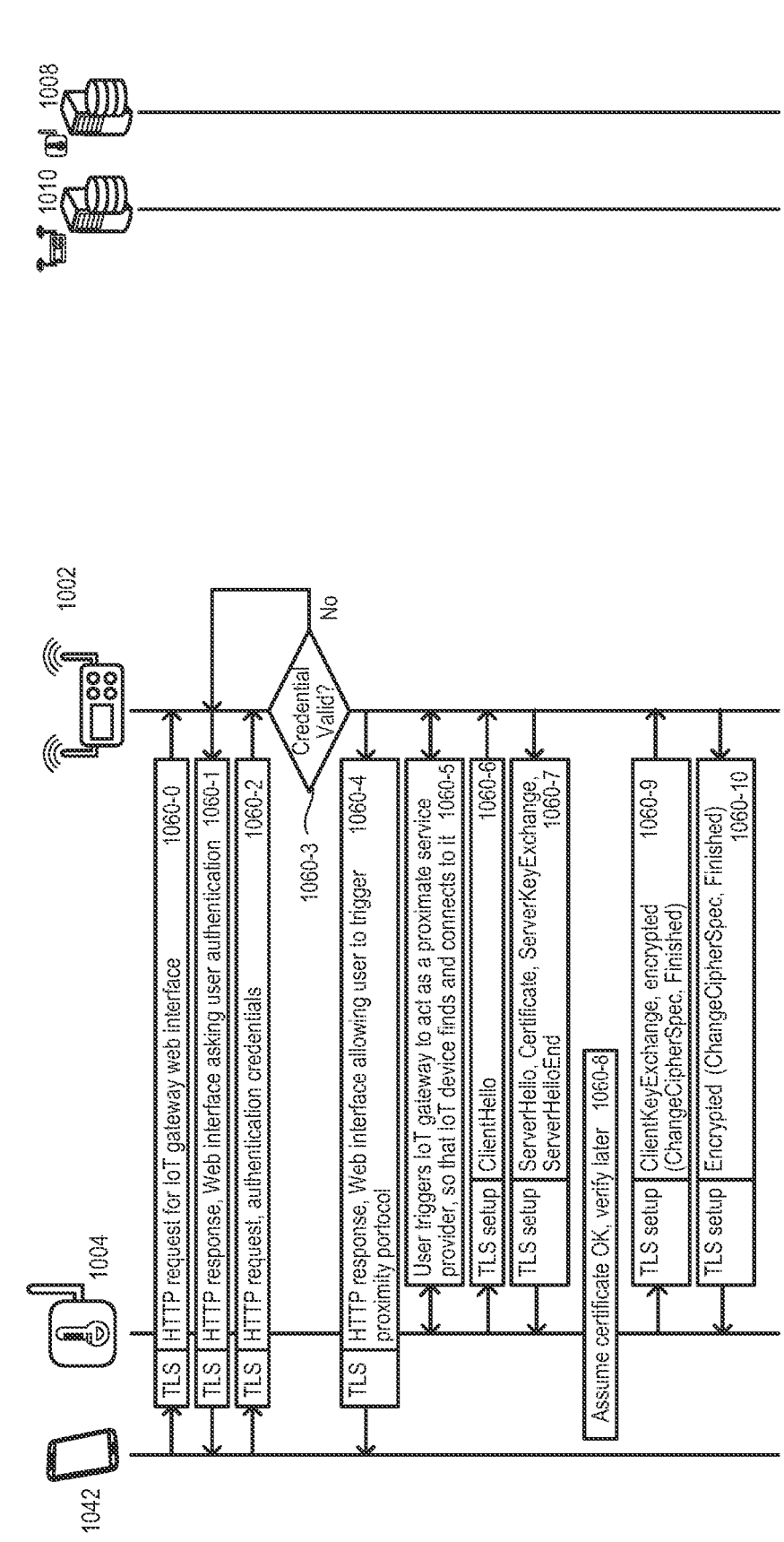

Referring to FIG. 10A, initially IoT device 1004 has not been commissioned, while gateway device 1002 has already been commissioned by a method like that shown in FIGS. 9A to 9O, as but one example. Gateway device 1002 can include a device 3P attestation protocol, as will be described below. It is assumed that a user has created a user account on gateway server 1010 prior to commissioning the IoT device 1004.

With the help of an installed application, a user device can connect to gateway device 1002. In the embodiment shown, such action can include the user device first connecting to an HTTPS port of the gateway device 1060-0. A gateway device can request authentication from the user device 1060-112. If authentication is not successful (No from 1060-3), authentication can be repeated, and the process stopped if there are too many authentication failures.

If user authentication is successful, a gateway device can be activated to connect to a to-be-commissioned IoT device. In the embodiment shown, gateway device can be triggered by way of a Web interface of the user device 1060-4 to start some wireless proximity protocol (such as Wi-Fi Direct/P2P or Wi-Fi Aware-NAN or BLE advertising or ZigBee service discovery protocol) and act as a proximate service provider with low signal strength (providing "IoT device user initialization" service). A user can then trigger the to-be-commissioned IoT device to seek the "IoT device user initialization" service (by pressing a physical button or resetting the IoT device), so that the IoT device can find and connect to the gateway device over an open wireless link (the wireless link could be a Wi-Fi link, a BT/BLE link, or a ZigBee link, depending on the IoT device) 1060-5.

Once the IoT device has found the gateway device, the IoT device can establish a secure connection with the gateway device. In the embodiment shown this can include the IoT device opening a TLS socket connection to a port of the gateway device that corresponds to an "IoT device user initialization" service (the underlying protocol for the TLS socket connection can be different for different types of IoT devices; it could be IPv4 for Wi-Fi devices, BT/BLE serial link for BT/BLE devices, and IPv6 for ZigBee devices) 1060-617. Since the IoT device is not configured to have Internet connectivity yet, it can temporarily trust a public key in the gateway device's certificate 1060-8 to complete setting up the TLS socket connection with the gateway device 1060-9/10. In some embodiments, a gateway device can provide IoT device with data for contacting a gateway server.

After a connection has been established between the IoT device and the gateway device, the IoT device can start a 3P attestation protocol twice. In a first 3P attestation protocol, IoT device can establish a secure connection to a gateway server, with the gateway device acting as an intermediary. In a second 3P attestation protocol, IoT device can establish a secure connection to a related cloud server, with the gateway device acting as an intermediary.

Referring to FIGS. 10B and 10C, in a first 3P attestation protocol, an IoT device can provide a URL for the gateway server to gateway device 1060-11. In response, gateway device can setup a secure connection with gateway server 1060-12/13. Such an action can include gateway device confirming a certificate of gateway server 1060-14. If a certificate is not valid (No from 1060-14), a process can end 1060-15. If a certificate is valid, a secure connection can be established between gateway device and gateway server 1060-16/17. After the socket connection between the gateway device and gateway server is established, a gateway device can indicate to the IoT device that such a connection is ready 1060-18.

The IoT device can then authenticate the gateway server. In the embodiment shown, the IoT device open a TLS connection to verify the gateway server's public key from its certificate 1060-19a to -19c (which can be signed by a well-known CA and the IoT device can have the CA's public key as a prior knowledge). If the gateway server's credential is not valid (No from 1060-20), the process can stop 1060-21. If the gateway server's credential is valid (e.g., its public key is the same as the signer's public key in the gateway device's certificate), the IoT device can confirm the TLS connection between the gateway device and itself is secure.

An IoT device can then create another secure connection to the gateway server to authenticate the gateway device. In FIG. 10B, IoT device can open a TLS socket connection to the gateway server (this TLS connection provides end-to-end security between the IoT device and the gateway server) and start relaying TLS messages between the gateway server and the IoT device 1060-22 to -25.

Referring to FIG. 10C, after the TLS connection between the gateway server and the IoT device is established, the IoT device can ask if the gateway device ID and certificate are valid (which are learned by the IoT device when it set up the TLS connection to the gateway device) 1060-26 to -29. If the IoT device receives a negative answer (No from 1060-30), the process can stop 10060-21. If the IoT device receives a positive answer, the IoT device can trust the gateway device, and thus can use it to contact its own cloud server. It then closes the TLS connection with the gateway device's cloud server.

Referring to FIG. 10O, in a second 3P attestation protocol executed by the IoT device, the IoT device sends its own cloud server's URL and a TLS connect request to the gateway device for relay by the gateway server to its cloud (i.e., local device) server 1060-31.

Figure 10D:
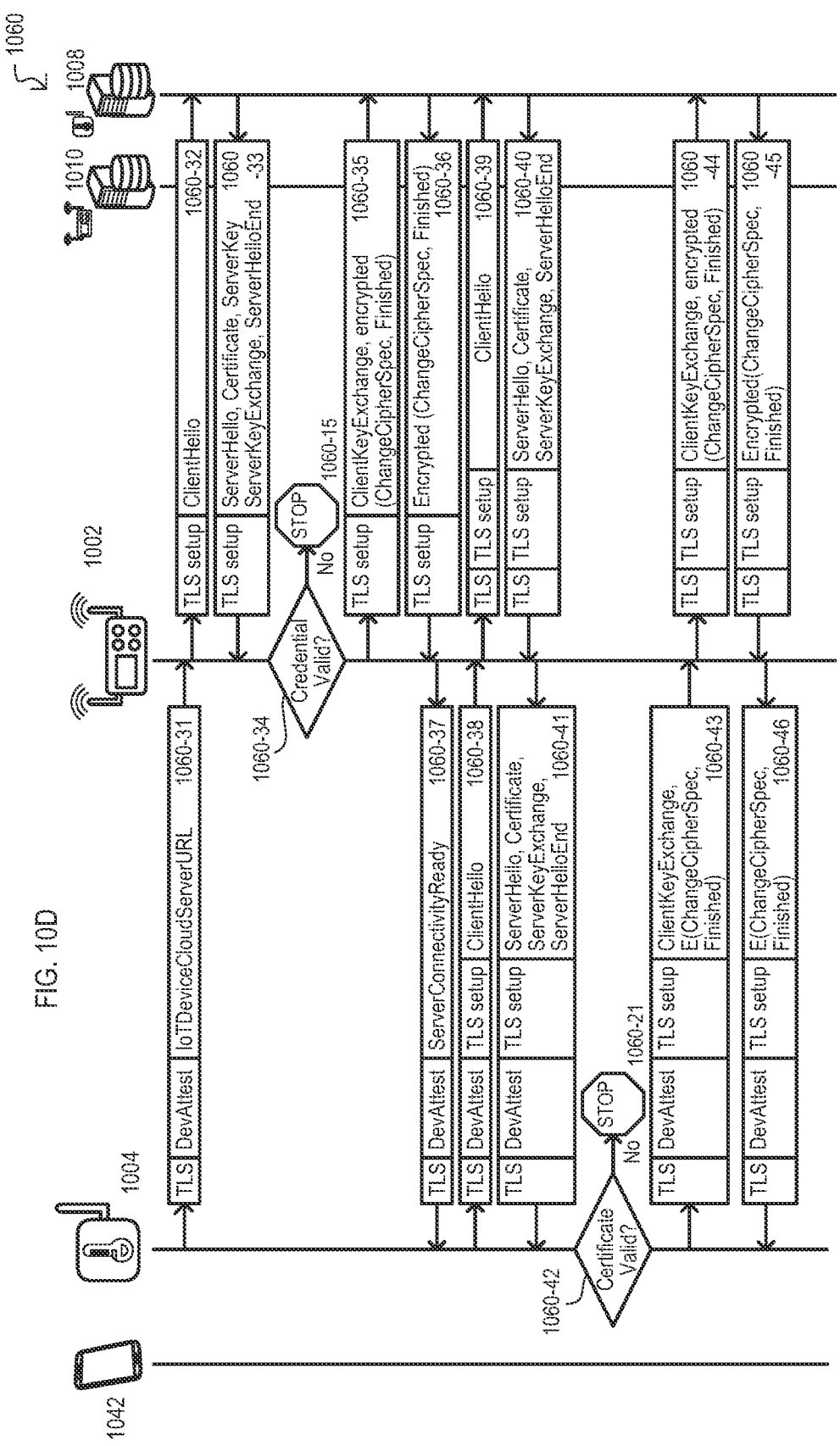

The gateway device can then establish a secure connection with the cloud server and authenticate the cloud server. In FIG. 10D, this includes the IoT device opening another TLS socket connection to the cloud server 1060-32/33. The IoT device can determine of the cloud server's security credentials are valid 1060-34. If the cloud server's credentials are not valid (No from 1060-34), the process can stop 1060-15. If the cloud server is authenticated, the gateway server has determined the cloud server can be trusted and completes a TLS socket connection 1060-35/36. The gateway device can indicate to the IoT device that such a connection is ready 1060-37.

The IoT device can then authenticate the cloud server 1060-38 to -41. If the cloud server's credential is not valid (No from 1060-42), the process can stop 1060-21. If the cloud server's credential is valid, the IoT device can confirm the TLS connection between the cloud server and itself is secure.

The IoT device can then open another secure connection with the cloud server to enable end-to-end security. In FIG. 10D, this can include the IoT device creating another TLS socket connection to the IoT device's cloud server and relaying TLS messages between the IoT device's cloud server and the IoT device 1060-43 to -46. An IoT device can then be authenticated by the cloud server.

Figure 10E:
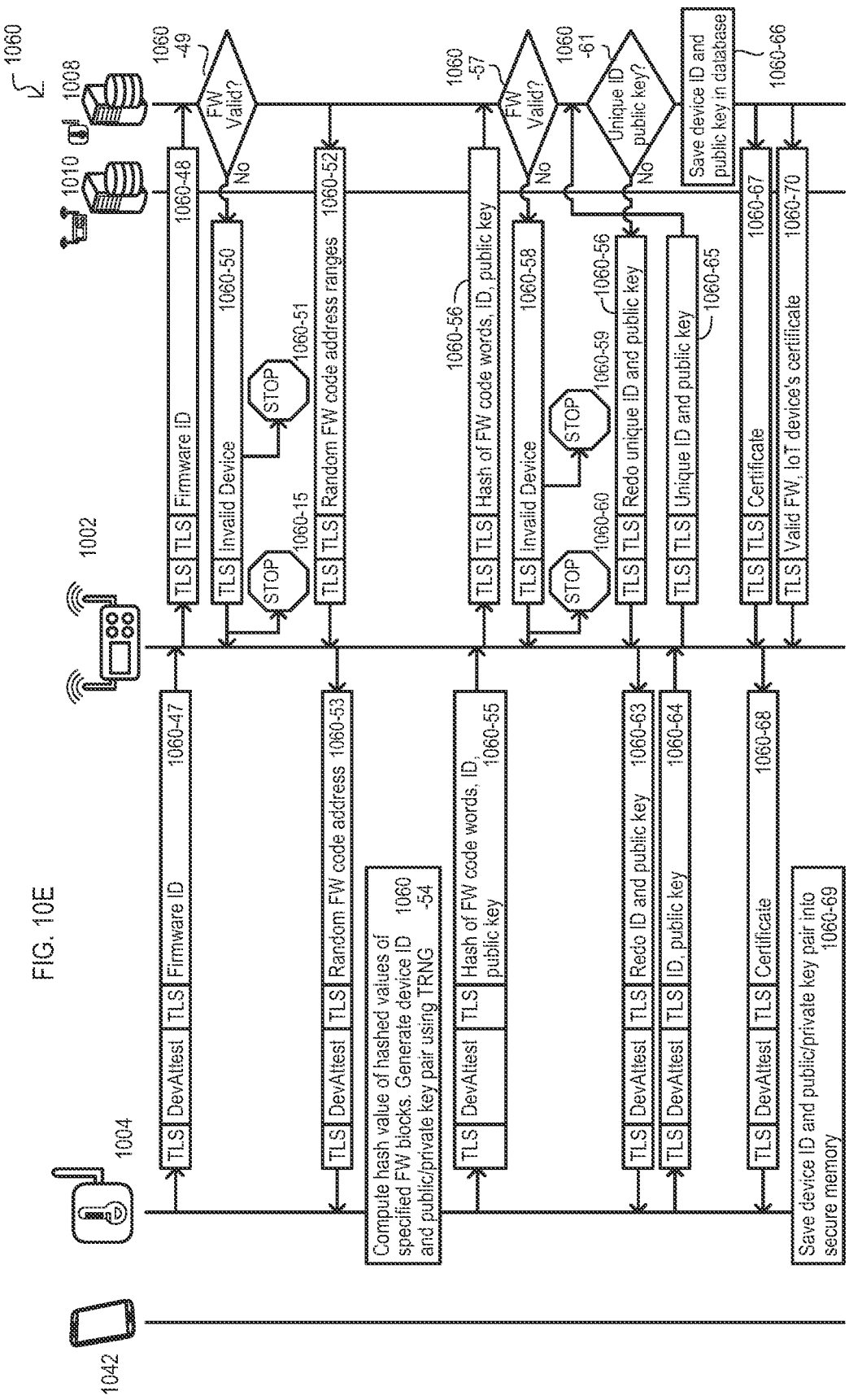

Referring to FIG. 10E, in the embodiment shown, authentication of an IoT device can include firmware validation like that described for authentication of the gateway device described in FIG. 9B. Thus, actions 1060-47 to -69 can be the same as, or equivalents of, those shown as 962-20 to -40 in FIG. 9B. The second 3P attestation protocol can then end.

Referring to FIG. 10F, with the IoT device determined to be trustful, it can be added to the system (e.g., aggregated with other IoT device by the gateway device). In some embodiments, this can include the gateway device signaling the user device that the IoT device is ready to be added. In the embodiment shown, a gateway device can update its Web interface to signal the to-be-configured IoT device is trustful 1060-71.

A user can then select the IoT device to add it to the system. In the embodiment shown, this can include a user clicking on the IoT device in the gateway device's Web interface 1060-72. This can trigger the gateway device to send a request to the IoT device over the TLS connection between them to generate an indication to the user 1060-73. The IoT device can generate the indication. In particular embodiments, the indication can be generated several times or with some delay 1070-74. Such an indication can take the form of any of those described herein or equivalents (e.g., visual, auditory, tactile, etc.)

After generating the indication, the user can be queried to confirm the indication was detected by the user. This can prevent a nearby user from mistakenly or hostilely configuring the IoT device that is being configured by the user. In the embodiment shown, the gateway device can update its Web interface to request user input confirming the indication was correctly observed (e.g., how many times the indication signal was shown or how much delay was before the indication) 1060-75/76. If the indication is not detected (No from 1060-77), the process can stop 1060-78 (or be repeated a number of times).

If the indication was observed by the use the user can provide input confirming the indication was correctly observed (e.g., how many times the indication signal was shown or how much delay was before the indication), which can be relayed to the user device via the gateway device 1060-79/80. To rule out coincidence, the above two steps can be repeated several times, each time with a random repeating time or a random delay. If the user does not give a correct input values (No from 1060-81), the process can stop (or be repeated).

After the user gives correct input, the IoT device can determine if it is already registered with (i.e., owned by) another user 1060-82. If an account exists (i.e., it has already been registered) (Yes from 1060-82), it can request user authentication 1060-83. If the IoT device has not been previously registered, it can request account information from the gateway device 1060-84, which will relay the request to the user device 1060-85.

Referring to FIG. 10G, user account information (for enabling access to the IoT device) can be provided by a user device (or the gateway device) to the IoT device 1060-86/87, and the IoT device can store such data in a secure memory 1060-88. After such data is saved, the IoT device can be considered registered (i.e., owned), and it will not allow any other user to configure it until the user account is deleted by the legitimate user (i.e., the IoT device can only be decommissioned by the original user who commissioned it).

After the user account information is securely saved in the IoT device, a user can configure the IoT device. In FIG. 10G, such actions can include the IoT device requesting input on configuration to the gateway device 1060-89. The gateway device can request such configuration data from the user device. For example, the gateway device's Web interface can provide for user input 1060-90. For example, such actions can include assigning a meaningful name for the IoT device (so that the IoT device will be referenced by this name as a first-level sub-tree to the gateway device), setting up secure wireless connection with the gateway device, etc.

A user can provide configuration data to the gateway device 1060-91 which can relay the data back to the IoT device 1060-92. IoT device can carry out the requested configurations, then save the gateway certificate 1060-93. It can then signal to the gateway device it is ready for service in the system 1060-94.

After configuration of the IoT device is finished, the gateway device can save the bonding relationship in its own non-volatile memory 1060-95 and pass the bonding information to the IoT device to save in the IoT device's non-volatile memory. The bonding information can assure that the IoT device can connect to the gateway device over a secure wireless link whenever needed.

The IoT device can then close the TLS connection with the gateway device, and start running IoT protocols with the gateway device, as if the gateway device was a cloud server for the IoT device 1060-97. The gateway device can start (or continue) to run IoT protocols with its gateway server, aggregating all connected IoT devices, to appear as one complex IoT device to the gateway server. It is noted that a commissioned IoT device will not run wireless proximity protocol to seek the "IoT device user initialization" service until it is decommissioned.

In an embodiment like that of FIGS. 10A to 10G, a gateway device can serve as an IoT cloud server proxy for the IoT device. The gateway device can update the IoT device's state changes as its own sub-tree state changes. The gateway device can also retrieve the pending sub-tree state change commands from the cloud server and provide shadowing service to the IoT device, until the IoT device retrieves the pending sub-tree state change command and confirms the sub-tree state change. The gateway device can then confirm the sub-tree state change is done to the cloud server.

After the IoT device is put into use, the user can connect to the gateway device at any time (e.g., connect to its HTTPS port) to change the configuration of, or to decommission the IoT device. Since the gateway device and the IoT device both have user account stored in their non-volatile memory, they will both need the user to authenticate before proceeding. In some embodiments, the user can enter password in the gateway device's Web interface as authentication credential, and the gateway device can forward the password over the secured wireless link to the IoT device as authentication credential.

Referring now to FIG. 11A to 11F, a user device application and method for commissioning a gateway device is shown in a series of diagrams. Referring to FIG. 11A, a user device 1142 can include an application 1178 stored thereon in memory, such as nonvolatile memory, for execution by one or more processors of the user device 1142. While a user device 1142 is shown as a smartphone, a user device can take the form of any of those shown herein, or equivalents.

Referring to FIG. 11B, when an application is active, a user device can detect a to-be-commissioned gateway device. Such an action can include initializing the gateway device in some way (e.g., turning it on, pressing a button). Such an action can also include a gateway device or user device entering a discovery protocol. An application can request a user input 1180-0 to start a gateway device commissioning process. If the user selects the input 1180-0, a user device can establish a secure connection with a gateway server 1181. In some embodiments, this can include a user device receiving a URL or network address from the gateway device, or some other source (i.e., when installing the application 1178, or from the packaging provided with the gateway device).

Referring to FIG. 11O, a user device application 1178 can execute a 3P attestation protocol as described herein, to establish a secure connection 1182 between the gateway device and gateway server, with the user device acting as an intermediary. The gateway device can then be authenticated according to the methods shown herein or equivalents.

Referring to FIG. 11D, once the gateway device has been authenticated, the application 1178 can be notified. In response, the application can request a user input 1180-1 to add the gateway device. In response to user input 1180-1, a gateway device can generate an indication to be observed by a user according to any of the methods described herein, or equivalents.

Referring to FIG. 11E, in response to receiving notice from the gateway device that an indication has been generated, the application 1178 can request user input 1180-2 to confirm the indication has been observed. In the embodiment, shown, the request is to enter a number of blinks, however, indications take various other forms as noted herein.

Referring to FIG. 11F, upon receiving correct user input on the indication, the gateway device can be added to a system. In some embodiments, a user can be requested to configure the gateway device, as noted for other embodiments herein.

Figure 12A:
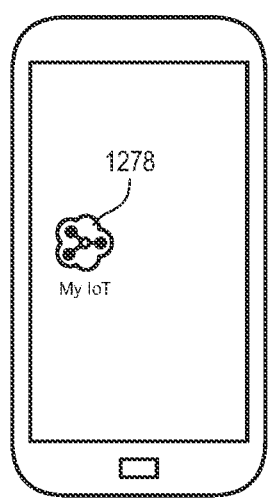
FIGS. 12A to 12G are a sequence of diagrams showing a user device application for commissioning a local device according to an embodiment.

Referring now to FIG. 12A to 12G, a user device application and method for commissioning a local device with gateway device is shown in a series of diagrams. Referring to FIG. 12A, a user device 1242 can include an application 1278 stored thereon in memory, such as nonvolatile memory, for execution by one or more processors of the user device 1242. While a user device is shown as a smartphone, a user device can take the form of any of those shown herein, or equivalents.

Figure 12B:
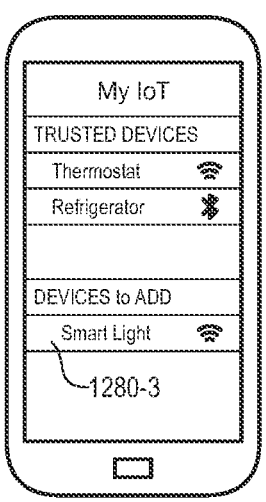

Referring to FIG. 12B, a user device application can present devices currently aggregated by a commissioned gateway device (TRUSTED DEVICES). In addition, a user device can detect a to-be-commissioned local device. Such an action can include any of those described herein, including those used to detect to-be-commissioned gateway devices. An application can present a user input 1280-3 to enable a user to select a local device from all detected non-commissioned devices (DEVICES to ADD).

Figure 12C:
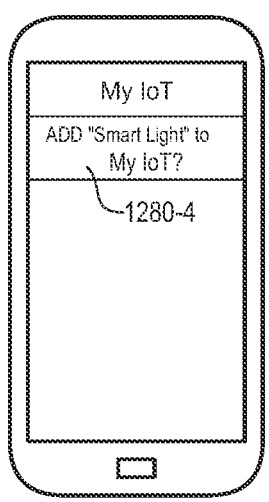

Referring to FIG. 12C, if the local device is selected, an application can request a user input 1280-4 to start a local device commissioning process.

Figure 12D:
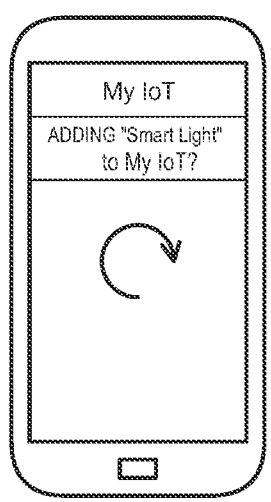

Referring to FIG. 12D, if the user selects the input 1280-3, a user device can signal the commissioned gateway to open a connection to the IoT device, and then start a first 3P attestation protocol to authenticate the gateway device and gateway server. A second 3P attestation protocol can then be executed to authenticate the local device server and the local device. Such actions can include any of those described herein or equivalents.

Figure 12E:
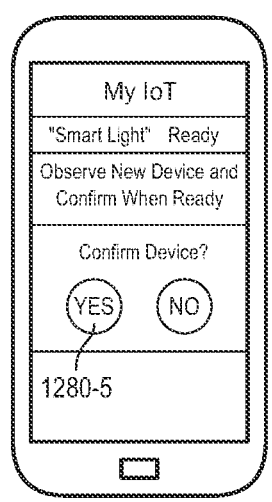

Referring to FIG. 12E, once the local device has been authenticated, the application 1278 can be notified. In response, the application can request a user input 1280-5 to add the local device to a system. In response to user input 1280-5, a local device can generate an indication according to any of the methods described herein, or equivalents.

Figure 12F:
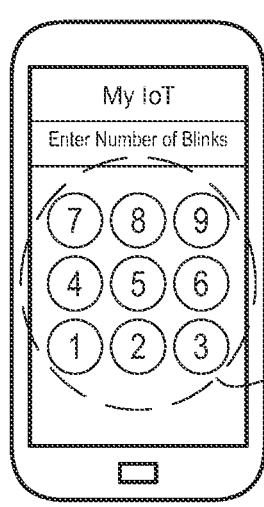

Referring to FIG. 12F, in response to receiving notice from the local device that an indication has been generated, the application 1278 can request user input 1280-2 to confirm the indication has been observed. In the embodiment, shown, the request is to enter a number of blinks. However, indications take various other forms as noted herein.

Figure 12G:
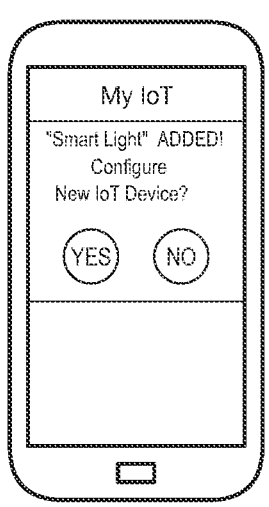

Referring to FIG. 12G, upon receiving correct user input on the indication, the local device can be added to a system. In the embodiment shown, the application can then present the user with the option of configuring the local device.

While embodiments can include systems of any suitable application, particular systems will now be described.

Figure 13:
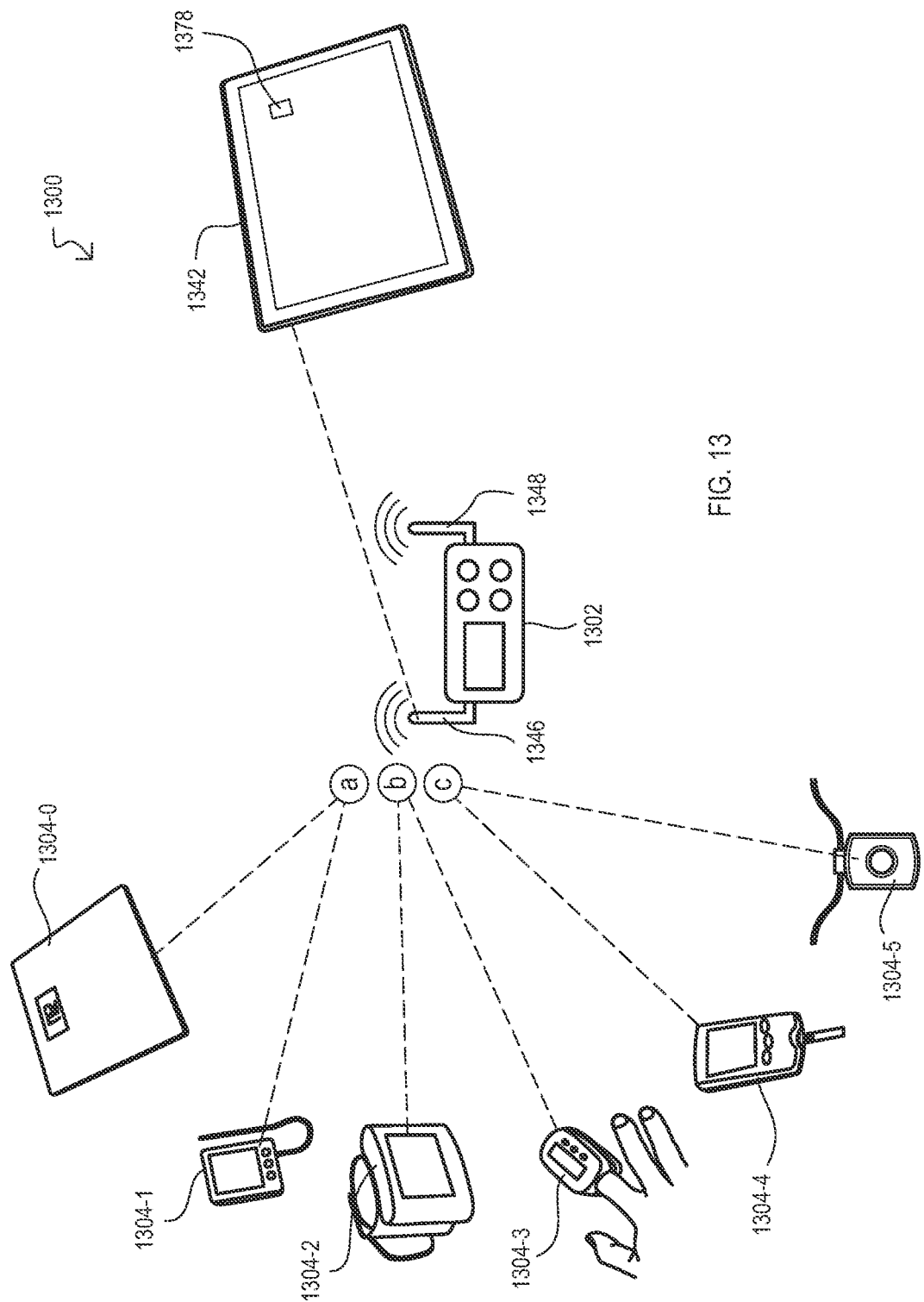
FIG. 13 is a block diagram of an IoT medical system having a gateway device for aggregating IoT devices according to an embodiment.

FIG. 13 shows a health care application system 1300 according to an embodiment. A system 1300 can include various local devices 1304-0 to -5, a gateway device 1302 and a user device 1342. Local devices (1304-0 to -5) can include any suitable medical related devices, and in the very particular embodiment shown, can include a scale 1304-0, a thermometer 1304-1, a blood pressure meter 1306-2, a pulse/oximeter 1304-3, a glucose meter 1304-4, and a personal alert device 1304-5.

The various local devices (1304-0 to -5) can be connected to gateway device 1302 according to any of numerous communication protocols (shown as "a", "b" and "c") by operation of the gateway device's internal communication IF 1346.

Gateway device 1302 can aggregate the local devices (1304-0 to -5) to appear as one logical entity and serve as a proxy for accessing a larger network (e.g., the Internet).

A user device 1342 can communicate directly with the gateway device via internal communication IF 1346 to add, remove or configure local devices. User device 1342 can include an application 1378 for commissioning devices as described herein, or an equivalent.

Figure 14:
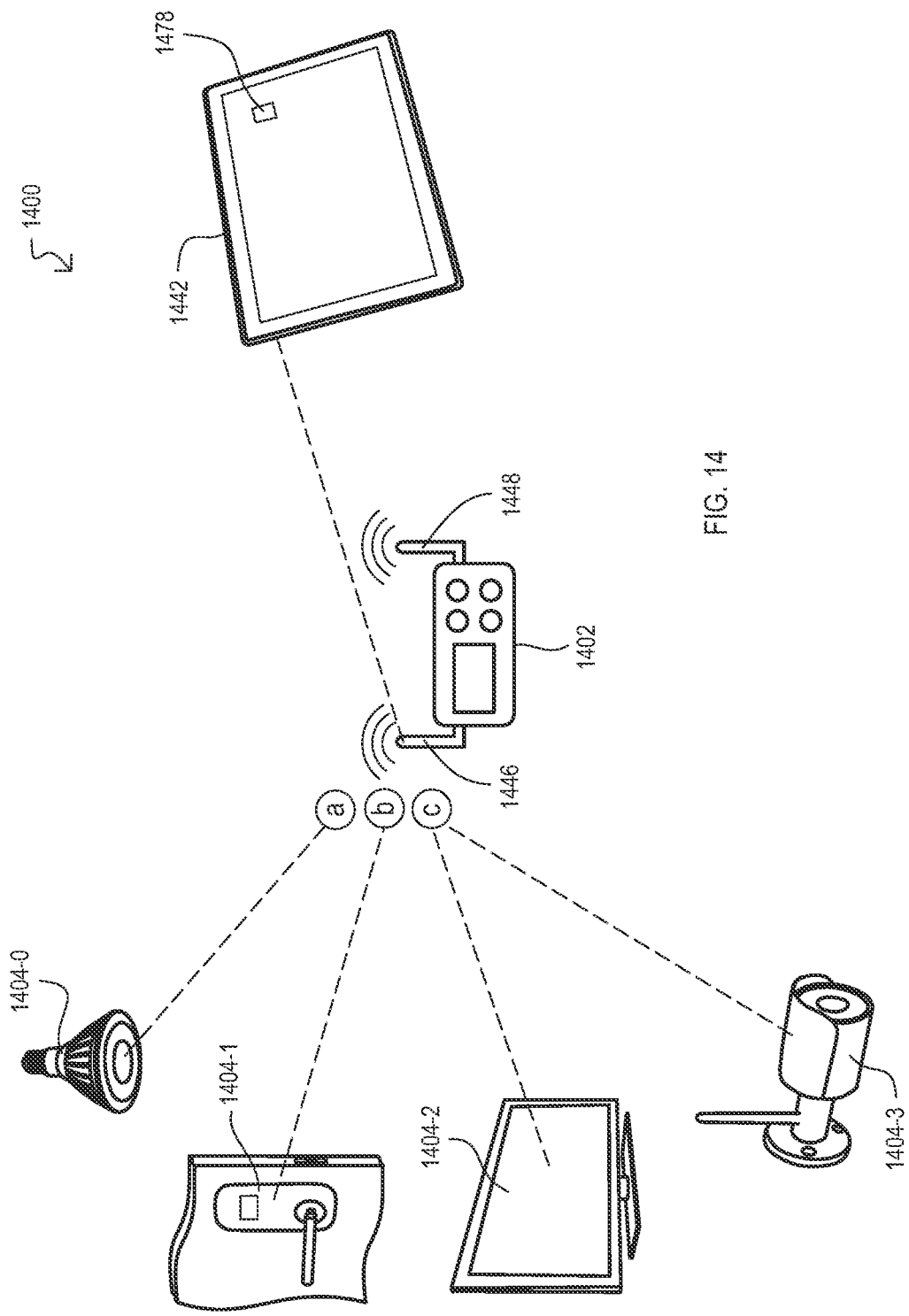
FIG. 14 is a block diagram of an IoT home automation system having a gateway device for aggregating IoT devices according to an embodiment.

FIG. 14 shows a home automation system 1400 according to an embodiment. A system 1400 can include various local devices 1404-0 to -5, a gateway device 1402 and a user device 1442. Local devices (1404-0 to -3) can include any suitable home automation devices, and in the very particular embodiment shown, can include lighting devices 1404-0, a locking devices 1404-1, an entertainment devices 1404-2 and a security devices 1404-3.

System 1400 can otherwise have the same connections and features as that shown in FIG. 13, or equivalents.

Embodiments described herein are in contrast to conventional IoT product models where every IoT device/system has an end-to-end secure connection with an IoT cloud server. According to embodiments, architectures can have one logical device (i.e., gateway device) with multiple hierarchical sub-trees connected to one server (e.g., gateway server), with local devices (e.g., IoT devices) existing "behind" the gateway device, and thus appearing from a network side as top-level sub-trees, which may have one or more named state variables or sub-trees. A server can handle all state variables without knowing they are on separate local devices behind the gateway device.

Embodiments can provide various advantages as compared to conventional approaches. For example, embodiments include methods or protocols for a user to securely commission a gateway device, which can run between an application on a user device, a to-be-commissioned gateway device, and a gateway server. The application, gateway device, and gateway server can have a common controlling source (e.g., same manufacturer). Such embodiments may not require anything more from the user than configuring an ordinary IoT controlling unit using very simple steps: triggering an IoT controlling unit (i.e., gateway device) to start configuration protocol, creating a user account at a cloud server (i.e., gateway server), and configuring the IoT controlling unit. However, a method/protocol according to embodiments can offer the following advantages over conventional approaches: (1) it can prove to a user that a to-be-configured gateway device trustful; (2) it can prevent a user from mistakenly configuring a nearby same-type gateway device; and (3) it can prevent a nearby user from hostilely/mistakenly configuring a gateway device that is being configured by a legitimate user.

Embodiments can also include methods/protocols for a user to securely commission a local (e.g., IoT) device via a commissioned gateway device, which runs between the to-be-commissioned local device and a cloud server, where the cloud server is owned or contracted by the local device's manufacturer (which could be different from the gateway device's manufacturer). The method/protocol may not require anything more from the user than steps as simple as those used to configure an ordinary IoT device: triggering the local device to start a configuration protocol, creating a user account at a cloud server, and configuring the local device. However, the method/protocol can offer the following advantages over conventional approaches: (1) it can prove to a user that a to-be-configured local device is trustful; (2) it can prove to the local device that it connects to a trustful gateway device; (3) it can prevent a user from mistakenly configuring a nearby same-type local device; and (4) it can prevent a nearby user from hostilely/mistakenly from configuring a local device that is being configured by a legitimate user.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising, by operation of an intermediate device:
   establishing a first wireless connection with a first wireless device according to a first communication protocol;
   receiving at least a uniform resource locator (url) from the first wireless device over the first wireless connection;
   establishing a second wireless connection with a server located by the url according to a second communication protocol that is different than the first communication protocol; and
   relaying attestation communications received over the first wireless connection to the server over the second wireless connection; wherein
   the attestation communications are transmitted over a secure connection with end-to-end security between the first wireless device and the server.

2. The method of claim 1, wherein:
   the second wireless connection includes a first transportation layer security (TLS) connection established with the server; and
   the secure connection includes a second TLS connection within the first TLS connection.

3. The method of claim 1, wherein the first communication protocol is a peer-to-peer protocol.

4. The method of claim 1, further including:
   receiving a first security certificate corresponding to the first wireless device from the server over the second wireless connection;
   receiving a second security certificate from the first wireless device over the first wireless connection; and
   validating the first wireless device with the first security certificate and second security certificate.

5. The method of claim 1, wherein the attestation communications include at least an identification (ID) value stored by the first wireless device.

6. The method of claim 5, wherein:
   the ID value comprises a firmware ID value for firmware stored by the first wireless device; and
   the attestation communications further include at least one hash value generated by hashing portions of the firmware indicated in a message received from the server over the secure connection.

7. The method of claim 1 further including:
   before establishing the second wireless connection with the server,
   receiving at least a server security certificate for the server over the second wireless connection, and
   validating the server with the server security certificate.

8. A method, comprising, by operation of a first wireless device:
   establishing a first wireless connection with an intermediary device according to a first communication protocol;
   transmitting at least a uniform resource locator (url) to the intermediary device over the first wireless connection;
   receiving a notification from the intermediary device that a second wireless connection has been established with a server located by the url;
   establishing a secure connection with the server over the first wireless connection and the second wireless connection, the secure connection having end-to-end security between the first wireless device and the server; and
   transmitting attestation communications to the server through the intermediary device over the secure connection.

9. The method of claim 8, wherein first communication protocol is a peer-to-peer protocol.

10. The method of claim 8, wherein:
    the second wireless connection includes a first transportation layer security (TLS) connection; and
    the secure connection includes a second TLS connection within the first TLS connection.

11. The method of claim 8, wherein the attestation communications include at least an identification (ID) value stored by the first wireless device.

12. The method of claim 11, wherein:
the ID value includes a firmware ID value for firmware; and
the attestation communications further includes at least one hash value generated by hashing portions of the firmware indicated in a message received from the server over the secure connection.

13. The method of claim 8, further including:
receiving a server security certificate from the server over the secure connection; and
validating the server with the server security certificate before transmitting the attestation communications.

14. The method of claim 8, further including:
transmitting a device identification (ID) value to the server over the secure connection; and
in response to an ID rejection from the server over the secure connection
generating a new device ID value, and
transmitting the new device ID value to the server over the secure connection.

15. A system, comprising:
a first wireless device configured to
establish a first wireless connection with an intermediary device according to a first communication protocol,
transmit at least a uniform resource locator (url) to the intermediary device over the first wireless connection,
receive a notification from the intermediary device that a second wireless connection has been established with a server at the url,
establish a secure connection with the server over the first wireless connection and the second wireless connection, the secure connection having end-to-end security between the first wireless device and the server, and
transmitting attestation communications to the server through the intermediary device over the secure connection; and
the intermediary device configured to
establish the second wireless connection with the server,
receive a device security certificate from the server over the second wireless connection, and
validate the first wireless device with the device security certificate.

16. The system of claim 15, wherein:
the intermediary device is further configured to
before establishing the second wireless connection with the server,
receive a server security certificate for the server, and
validate the server with the server security certificate.

17. The system of claim 15, wherein:
the first wireless device is configured to
transmit a firmware (FW) ID value as part of the attestation communications, and
in response to FW addresses received from the server
execute a hash function on values located at the FW addresses to generate FW hash values, and
transmit the FW hash values to the server; and
the server is configured to validate the FW of the first wireless device with FW hash values received over the secure connection.

18. The system of claim 15, wherein:
the second wireless connection includes a first transportation layer security (TLS) connection; and
the secure connection includes a second TLS connection within the first TLS connection.

19. The system of claim 15, wherein:
the first wireless device is further configured to
transmit a device identification (ID) value to the server over the secure connection, and
in response to an ID rejection from the server,
generate a new device ID value, and
transmit the new device ID value to the server.

20. The system of claim 15, wherein:
the first wireless device is further configured to
transmit at least one encryption key to the server over the secure connection, and
in response to an encryption key rejection from the server,
generate a new encryption key, and
transmit the new encryption key to the server.

* * * * *